US007092898B1

(12) United States Patent
Mattick et al.

(10) Patent No.: US 7,092,898 B1
(45) Date of Patent: Aug. 15, 2006

(54) COMMUNICATION SYSTEM AND METHOD FOR SUSTAINING THE ENVIRONMENT BY USING THE INTERNET

(75) Inventors: William O. Mattick, Novi, MI (US); Lawrence I. Ranka, Northville, MI (US)

(73) Assignee: Environmental Performance Research Institute, L.L.C., Novi, MI (US)

( * ) Notice: Subject to any disclaimer, the term of this patent is extended or adjusted under 35 U.S.C. 154(b) by 443 days.

(21) Appl. No.: 09/653,555

(22) Filed: Sep. 1, 2000

Related U.S. Application Data

(60) Provisional application No. 60/151,827, filed on Sep. 1, 1999.

(51) Int. Cl.
G06F 17/60 (2006.01)
(52) U.S. Cl. ...................................................... 705/26
(58) Field of Classification Search ................. 705/26, 705/27, 14
See application file for complete search history.

(56) References Cited

U.S. PATENT DOCUMENTS 6,490,565 B1 * 12/2002 Beldock ........................ 705/1

FOREIGN PATENT DOCUMENTS

DE 19743878 A1 * 4/1999

OTHER PUBLICATIONS www.bbbonline.org [archived at www.archive.org, Jan. 23, 1998].*
"First-Ever Green Guide to Cars and Trucks Helps Buyers Choose Most Environmentally Friendly Vehicles That Meet Their Needs", PRNewswire, Mar. 17, 1998 [DIALOG File 813, Accession No. 1244108].*
Nauman, Matt: "How Green is My . . . ? Gas Hogs Get Their Comeuppance in a Book That Rates Cars, Trucks, Minivans and Sport-Utilities by Their Impact on Environment", San Jose Mercury News, Morning Final Section: Drive, p.: 1G, Apr. 3, 1998.*
[DIALOG File 634, Accession No. 09593075].*
www.aceee.org [archived at www.archive.org, Dec. 2, 1998].*
"Fuel economy ratings: 1995 mileage estimates—Special report, part 4", Consumers' Research Magazine, Washington, Nov. 1994, vol. 77, Iss. 11, p. 18.*
Markiewicz, David A.: "Ford trumpets Taurus' top spot", Detroit News, Detroit MI, Jan. 8, 1993, Sec. E, p. 2.*
No Author, "Edmunds.com and amesaward.com Announce the Most Environmentally Sensitive 2001 Model Year Vehicles" PR Newswire, Nov. 2000, pp. 5231.
No Author, "John Deere Launches New Environmental Web Site" PR Newswire, Sep. 2001.
No Author, "The Polk Company Becomes a Contributor to the Amesaward.com LLC" Business Wire, Oct. 2000.

(Continued)

Primary Examiner—Jeffrey A. Smith
(74) Attorney, Agent, or Firm—Reising, Ethington, Barnes, Kisselle, P.C.

(57) ABSTRACT

A method for developing ratings of the environmental sensitivity of vehicles and vehicle manufacturers and for communicating such ratings to consumers, manufacturers and other interested parties. The method utilizes the Internet for acquiring data and disseminating information and identifies vehicles available on the market to consumers with an environmental performance rating based upon a rating algorithm. Trophies are awarded in recognition of the top rated vehicles and manufacturers in regard to environmental sensitivity. The rating system and the identification of the award winners is communicated to consumers and to stake-holders such as the manufacturers, special interest groups and governmental agencies.

43 Claims, 10 Drawing Sheets

OTHER PUBLICATIONS

Stoffer, Harry, "EPA Eyes Green Rating Agency Wants to Rank Cars, Trucks Based on their Environmental Impact" Automotive News, Dec. 2000, v. 75, n. 5908 p. 3.

No Author, "AMES Award (TM) for Environmental Performance to be Presented to Toyota, Honda, Volkswagen, Mazda, Subaru and Suzuki at NY Auto Show" PR Newswire, Apr. 2000.

No Author, "Northern Telecom Provides 'Green' Data to Internet Users" Eco-Log Week, Apr. 1995, v. 23, n. 16.

DeCicco et al., "ACEEE's Green Book", 2000 (135 pgs).

DeCicco & Thomas, Green Guide to Cars and Trucks Model Year 1998, 1998, American Council for an Energy-Efficient Economy, Washington, D.C.

* cited by examiner

2001 MODEL YEAR SEGMENTATION
amesaward.com
PASSENGER VEHICLES -135 BRAND/MODELS

SUBCOMPACT CAR (28)

| | |
|---|---|
| CHEVROLET | CAVALIER |
| CHEVROLET | METRO |
| CHEVROLET | PRIZM |
| DAEWOOD | LANOS |
| DAEWOOD | NUBIRA |
| DODGE | NEON |
| FORD | ESCORT ZX2 |
| FORD | FOCUS |
| HONDA | CIVIC |
| HONDA | INSIGHT |
| HYUNDAI | ACCENT |
| HYUNDAI | ELANTRA |
| KIA | SEPHIA |
| KIA | SPECTRA |
| MAZDA | PROTÉGÉ |
| MITSUBISHI | MIRAGE |
| NISSAN | SENTRA |
| PLYMOUTH | NEON |
| PONTIAC | SUNFIRE |
| SATURN | S-SERIES |
| SUBARU | IMPREZA |
| SUZUKI | SWIFT |
| SUZUKI | ESTEEM |
| TOYOTA | COROLLA |
| TOYOTA | ECHO |
| TOYOTA | PRIUS |
| VOLKSWAGON | GOLF |
| VOLKSWAGON | JETTA |

*Figure 2Aa*

COMPACT (11)

| | |
|---|---|
| DAEWOOD | LEGANZA |
| FORD | CONTOUR |
| HYUNDAI | SONATA |
| MAZDA | 626 |
| MERCURY | MYSTIQUE |
| MITSUBISHI | GALANT |
| NISSAN | ALTIMA |
| OLDSMOBILE | ALERO |
| PONTIAC | GRAND AM |
| SUBARU | LEGACY |
| VOLKSWAGON | PASSAT |

MID-SIZE (15)

| | |
|---|---|
| BUICK | CENTURY |
| BUICK | REGAL |
| CHEVROLET | IMPALA |
| CHEVROLET | LUMINA |
| CHEVROLET | MALIBU |
| DODGE | STRATUS |
| FORD | TAURUS |
| HONDA | ACCORD |
| HYUNDAI | XG3 |
| MERCURY | SABLE |
| NISSAN | MAXIMA |
| OLDSMOBILE | INTRIGUE |
| PONTIAC | GRAND PRIX |
| SATURN | L-SERIES |
| TOYOTA | CAMRY |

FULL-SIZE (7)

| | |
|---|---|
| BUICK | LASABRE |
| CHRYSLER | CONCORDE |
| DODGE | INTREPID |
| FORD | CROWN VICTORIA |
| MERCURY | GRAND MARQUIS |
| PONTIAC | BONNEVILLE |
| TOYOTA | AVALON |

Figure 2Ab

2001 MODEL YEAR SEGMENTATION
amesaward.com
PASSENGER VEHICLES -135 BRAND/MODELS

PREMIUM (19)

| | |
|---|---|
| ACURA | TL |
| AUDI | A4/S4 |
| AUDI | A6 |
| BMW | 3-SERIES |
| BUICK | PARK AVENUE |
| CADILLAC | CATERA |
| CHRYSLER | LHS |
| CHRYSLER | 300M |
| INFINITI | G20 |
| INFINITI | I30 |
| LEXUS | ES 300 |
| LINCOLN | LS |
| MAZDA | MILLENIA |
| MERCEDES-BENZ | C-CLASS |
| MITSUBISHI | DIAMANTE |
| OLDSMOBILE | AURORA |
| SAAB | 9-3 |
| VOLVO | 40 |
| VOLVO | 70 |

SPORTY CAR (18)

| | |
|---|---|
| ACURA | NSX |
| ASTON MARTIN | DB7 |
| AUDI | TT |
| BMW | Z3 |
| CHEVROLET | CORVETTE |
| DODGE | VIPER |
| FERRARI | 456 MGT/MGTA |
| FERRARI | 550 MARANELLO |
| HONDA | S2000 |
| JAGUAR | XK8 |
| LEXUS | SC 300/400 |
| MAZDA | MIATA |
| MERCEDES-BENZ | CLK |
| MERCEDES-BENZ | SLK |
| MERCEDES-BENZ | SL-CLASS |
| PLYMOUTH | PROWLER |
| PORSCHE | 911 |
| PORSCHE | BOXSTER |

LUXURY (21)

| | |
|---|---|
| ACURA | CL |
| ACURA | RL |
| AUDI | A8 |
| BMW | 5-SERIES |
| BMW | 7-SERIES |
| BMW | 8-SERIES |
| CADILLAC | DEVILLE |
| CADILLAC | ELDORADO |
| CADILLAC | SEVILLE |
| INFINITI | Q45 |
| JAGUAR | S-TYPE |
| JAGUAR | XJ |
| LEXUS | GS 300/400 |
| LEXUS | LS 400 |
| LINCOLN | CONTINENTAL |
| LINCOLN | TOWN CAR |
| MERCEDES-BENZ | CL500 |
| MERCEDES-BENZ | E-CLASS |
| MERCEDES-BENZ | S-SERIES |
| SAAB | 9-5 |
| VOLVO | S80 |

SPORTS CAR (16)

| | |
|---|---|
| ACURA | INTEGRA |
| CHEVROLET | CAMARO |
| CHEVROLET | MONTE CARLO |
| CHRYSLER | PT CRUISER |
| CHRYSLER | SEBRING |
| DODGE | AVENGER |
| FORD | MUSTANG |
| HONDA | PRELUDE |
| HYUNDAI | TIBURON |
| MERCURY | COUGAR |
| MITSUBISHI | ECLIPSE |
| PONTIAC | FIREBIRD/TRANS AM |
| TOYOTA | CELICA |
| TOYOTA | SOLARA |
| VOLKSWAGON | CABRIO |
| VOLKSWAGON | NEW BEETLE |

2001 MODEL YEAR SEGMENTATION
*amesaward.com*
VANS AND LIGHT TRUCKS - 84 BRAND/MODELS

MINIVAN (15)

| | |
|---|---|
| CHEVROLET | ASTRO |
| CHEVROLET | VENTURE |
| CHRYSLER | TOWN & COUNTRY |
| CHRYSLER | VOYAGER |
| DODGE | CARAVAN |
| FORD | WINDSTAR |
| GMC | SAFARI |
| HONDA | ODYSSEY |
| MAZDA | MPV |
| MERCURY | VILLAGER |
| NISSAN | QUEST |
| OLDSMOBILE | SILHOUETTE |
| PONTIAC | MONTANA |
| TOYOTA | SIENNA |
| VOLKSWAGON | EUROVAN |

FULL SIZE PICKUP (8)

| | |
|---|---|
| CHEVROLET | SILVERADO 1500/2500 |
| DODGE | RAM 1500 |
| FORD | F-150 |
| GMC | SIERRA 1500 |
| LINCOLN | BLACKWOOD |
| TOYOTA | TUNDRA |

FULL SIZE VAN (4)

| | |
|---|---|
| CHEVROLET | G1500/2500 |
| DODGE | B1500/2500 |
| FORD | E150/250 |
| GMC | G1500/2500 SAVANA |

COMPACT PICKUP (8)

| | |
|---|---|
| CHEVROLET | S-10 |
| DODGE | DAKOTA |
| FORD | RANGER |
| GMC | SONOMA |
| ISUZU | HOMBRE |
| MAZDA | B-SERIES |
| NISSAN | FRONTIER |
| TOYOTA | TACOMA |

COMPACT SUV (13)

| | |
|---|---|
| CHEVROLET | TRACKER |
| FORD | ESCAPE |
| HONDA | CR-V |
| HYUNDAI | SANTA FE |
| ISUZU | AMIGO |
| ISUZU | VEHICROSS |
| JEEP | WRANGLER |
| KIA | SPORTAGE |
| MAZDA | TRIBUTE |
| SUBARO | FORESTER |
| SUZUKI | VITARA |
| SUZUKI | GRAND VITARA |
| TOYOTA | RAV4 |

*Figure 2Ba*

2001 MODEL YEAR SEGMENTATION
amesaward.com
VANS AND LIGHT TRUCKS - 84 BRAND/MODELS

| MID-SIZE SUV (23) | | FULL-SIZE SUV (15) | |
|---|---|---|---|
| ACURA | MAV/MDX | ACURA | SLX |
| BUICK | RENDEZVOUS | BMW | X5 |
| CHEVROLET | BLAZER | CADILLAC | ESCALADE |
| DODGE | DURANGO | CHEVROLET | SUBURBAN |
| FORD | EXPLORER | CHEVROLET | TAHOE |
| GMC | JIMMY | FORD | EXPEDITION |
| HONDA | PASSPORT | GMC | YUKON |
| INFINITI | QX4 | GMC | YUKON XL |
| ISUZU | RODEO | HUMMER | H1 |
| ISUZU | TROOPER | LAND ROVER | RANGE ROVER |
| JEEP | CHEROKEE | LEXUS | LX 470 |
| JEEP | GRAND CHEROKEE | LINCOLN | NAVIGATOR |
| LAND ROVER | DISCOVERY | MITSUBISHI | MONTERO |
| LEXUS | RX 300 | TOYOTA | LAND CRUISER |
| MERCEDES-BENZ | M-CLASS | TOYOTA | SEQUOIA |
| MERCURY | MOUNTAINEER | | |
| MITSUBISHI | MONTERO SPORT | | |
| NISSAN | PATHFINDER | | |
| NISSAN | XTERRA | | |
| OLDSMOBILE | BRAVADA | | |
| PONTIAC | AZTEK | | |
| TOYOTA | HIGHLANDER | | |
| TOYOTA | 4RUNNER | | |

*Figure 2Bb*

2000 MODEL YEAR AMES AWARD WINNERS
amesaward.com

PASSENGER VEHICLES

| CLASS (# OF ENTRIES) | SUBCOMPACT (26) | COMPACT | MID-SIZE (15) | FULL-SIZE (7) | PREMIUM (18) | LUXURY (18) | SPORTY CAR (15) | SPORTS CAR (15) |
|---|---|---|---|---|---|---|---|---|
| BEST | HONDA INSIGHT | SUBARU LEGACY | HONDA ACCORD | TOYOTA AVALON | INFINITI G20 | MERCEDES E-CLASS | VW CABRIO | MERCEDES CLK |
| PREFERRED | CHEVROLET PRIZM<br>FORD FOCUS<br>HONDA CIVIC<br>SUZUKI ESTEEM<br>TOYOTA COROLLA<br>TOYOTA ECHO | VW PASSAT<br>MAZDA 626 | CHEVROLET IMPALA<br>CHEVROLET MALIBU<br>SATURN L. SERIES<br>TOYOTA CAMRY | BUICK LASABRE | ACURA TL<br>INFINITI I30<br>SAAB 9-3<br>VOLVO 40 SERIES | ACURA RL<br>BMW 5 SERIES<br>LEXUS GS300/400<br>VOLVO S80 | HYUNDAI TIBURON<br>TOYOTA CELICA<br>TOYOTA SOLARA | AUDI TT COUPE<br>HONDA S2000<br>MAZDA MIATA MX-5<br>MERCEDES SLK230 |

VANS/LIGHT TRUCKS

| CLASS (# OF ENTRIES) | MINIVAN (15) | FULL-SIZE VAN (4) | COMPACT PICKUP (8) | FULL-SIZE PICKUP (8) | COMPACT SUV (9) | MID-SIZE SUV (15) | FULL-SIZE SUV (12) |
|---|---|---|---|---|---|---|---|
| BEST | HONDA ODYSSEY | FORD E150/E250 | GMC SONOMA | TOYOTA TUNDRA | SUBARU FORESTER | LEXUS RX300 | ISUZU TROOPER |
| PREFERRED | CHEVROLET ASTRO<br>FORD WINDSTAR<br>MERCURY VILLAGER | | CHEVROLET S-10 | | TOYOTA RAV4 | FORD EXPLORER<br>HONDA PASSPORT<br>ISUZU RODEO<br>MERCURY MOUNTAINEER | BMW X5<br>FORD EXPEDITION |

*Figure 3*

COMMUNICATION SYSTEM AND METHOD FOR SUSTAINING THE ENVIRONMENT BY USING THE INTERNET

CROSS-REFERENCE TO RELATED APPLICATION

This application claims priority from Provisional Application No. 60/151,827, filed Sep. 1, 1999, entitled "Communication System and Method of Using the Internet", which is incorporated by reference.

CROSS-REFERENCE TO SUBMITTED APPENDICIES

The following documents have been filed as appendices to the present application, and are incorporated by reference herein in their entireties:

Appendix A: "Car/Truck Brand/Model Awards, 2001 Model Year Criteria Description"; and Appendix B: "Evaluating the Environmental Performance of Passenger Vehicles".

FIELD OF THE INVENTION

This invention relates to information processing and dissemination using the Internet. More particularly, it relates to processing of environmental technical data relating to an industry to convert it into more meaningful information for persons and organizations related to the industry and making the meaningful information available to them through the Internet and other media.

BACKGROUND OF THE INVENTION

This invention addresses a longstanding need in industry for improved environmental related communications between a business entity and the public which, of course, includes prospective consumers of the products or services offered by the industry. The use of the Internet provides a new and creative approach that enhances the effectiveness of this invention above the traditional use of other media. This approach often entails communications with organizations such as special interest groups, consumer advocate groups, the media, organizations such as retailers in the relevant channels of trade and the like. As used herein, the term "industry" includes any branch of trade, business, manufacture, service provider, agriculture, labor union, whether profit or non-profit, such as the automobile industry, telecommunications industry, health care industry, educational organizations, etc.

The federal and state governments have promulgated regulations intended to sustain the environment by requiring industry, especially the automotive industry, to meet specific standards in product performance and in certain aspects of manufacturing operations. This has resulted in complex laws and regulations pertaining to air pollution and fuel consumption which tend to be somewhat arbitrary and inconsistent with the demands of the market place. The results are not effectively communicated to the consumer for serving as an aid in selection of a new vehicle. The governmental approach to sustaining the environment leaves much to be desired and lacks any element of a market-driven system.

The annual publication "*ACEEE's Green Book*" (hereafter Green Book) by the American Council for an Energy-Efficient Economy, Washington, D.C., lists certain ratings for detailed vehicle descriptions in respect to environmental performance. The rating system used for the publication is not compatible with industry or consumer needs.

The Green Book reports a "Green Score" on a scale from zero to 100 for certification vehicle configurations used by the government to determine compliance with applicable standards. The vehicles are grouped by class, i.e. type of body style, such as midsize car, minivan, standard pickup and so on. A summary of ratings indicating the top-rated certification vehicle configurations in each class is tabulated using five symbols based on a certification vehicle configuration's rank within its class. The tabulation also shows the Green Score for each of the certification vehicle configurations. The Green Score is based on official emissions and fuel-economy test results, other specifications reported by automobile manufacturers.

The Green Book rating and reporting of the environmental performance of certification vehicle configuration is not a market-driven system for sustaining the environment because it is not compatible with the way auto manufacturers advertise and sell their products or the way consumers gain awareness. The consumer and manufacturer focus is at the brand/model level not the certification vehicle configuration level. The creation of the environmental performance ratings in a timely manner at the brand/model level, rather than the certification vehicle configuration level is a non-trivial matter.

The Green Book is released half way through the model year thereby limiting its impact to those buyers in the later half of the model year. In most cases a consumer can not order a vehicle based on the way the Green Book describes them. According to the Green Book, the only way the a customer can be sure they are considering a vehicle the Green Book has rated is to lift the hood of the actual vehicle under consideration and check the emissions compliance label physically installed on the vehicle. In general, the information in the Green Book is as complicated as the government regulations that generated the certification data used in the ratings.

SUMMARY OF THE INVENTION

This invention provides a method of developing and communicating information regarding the products of a selected industry. The method implements a market-based system for sustaining the environment by using the Internet. The method facilitates the acquisition of environmental performance data relating to products of the industry and the processing of it to develop information meaningful and readily understandable by consumers of the products. According to the invention, information relating to an industry is developed and disseminated through the Internet by an independent business entity herein referred to as a "facilitator". This invention is useful in a variety of industries; however, it will be described herein with regard to the automotive industry as an illustrative example.

This invention comprises a method of consolidating environmental performance data on cars and light trucks in an easy-to-understand and industry compatible manner for use by: (1) the consumer in the process of selection of a vehicle for purchase, (2) the vehicle manufacturers to facilitate consideration and awareness of their products through advertising, (3) the vehicle manufacturers to assess their relative environmental position in the market place and develop plans for any needed change, (4) the e-commerce automotive information/buying services (hereafter e-commerce automotive businesses) to provide relevant comparative data to aid their customers in selecting a vehicle for purchase. A critical element of the invention is the use of a computer network, e.g. the Internet, as a means to transmit information and to establish links and relationships among parties having related interests in the industry. This allows business to be conducted electronically, i.e. e-commerce, to compensate the facilitator. Further, the environmentally sensitive manufacturers and the environmentally sensitive products will be recognized by presentation of awards.

The method of this invention involves communication with business entities within the selected industry and with potential consumers, purchasers of products or services, related industries and government. For example, when the method of the invention is applied to the automotive industry, the facilitator of the method would furnish the names of the manufacturers and products which are recipients of the awards to the following for their respective purposes, as follows:

- Automotive buyers—as a meaningful and understandable rating of environmental sensitivity of different models of vehicles to aid their purchase decision,
- Automotive manufacturers—as a means to facilitate differentiating their offerings on an environmental performance basis from a creditable third party,
- E-commerce automotive businesses—as a means to provide consumers with environmental performance information to aid their automotive comparison and purchase decision.
- Government agencies—as a viable market based contribution to environmental protection,
- Special interest groups (Sierra Club, Environmental Defense Fund, etc.)—as a viable market based contribution to environmental protection,
- Media—as a reinforcement of positive environmental activities by government and industry, and
- Wall Street/Insurance Industry—as a means to identify top environmentally sensitive, socially responsible companies.

A general objective of this invention is to provide a market-driven method of environmental performance communication by an industry, via the Internet and other media, with the public, potential consumers and others to provide easy-to-understand ratings of products or services in relation to environmental sensitivity. These ratings are based upon objective standards and developed by a credible source independent of the manufacturer or service provider. In a preferred implementation of the method of this invention, the ratings developed are symbolized by physical awards given periodically for the highest rated products or services and for the highest rated manufacturer or service provider. According to the invention, a market-based system for sustaining the environment is carried out by using the Internet as follows:

(a) selecting an industry from a group of industries having needs for improved environmental communications and marketing for its products, (b) identifying a class of products manufactured by the selected industry (e.g., car and light-truck) from which consumers may choose a product for purchase and for which consumers may desire to have environmental performance information to consider as a factor in selecting a product for purchase, (c) establishing a new e-commerce company for evaluating the individual products of said class of products in respect to the environmental performance of each individual product, said company being independent of the members of the selected industry.

(d) said e-commerce company developing an objective environmental performance rating system based upon a rating algorithm driven by quality assured data, (e) obtaining said data from government sources and private sector sources, (f) developing the virtual business relationships supporting the marketing services (e.g., award fabrication, logo merchandise, point-of-sale displays, consulting, etc.) offered by the said e-commerce company, (g) processing the data into ratings in accordance with said algorithm to identify the products which are the most environmentally sensitive, (h) and presenting physical awards in recognition of the most environmentally sensitive products to the manufacturers of those products, (i) establishing web site to communicate the rating system and the top environmental performers (award winners) to consumers and other stakeholders, (j) said e-commerce company facilitating the promotion of the results of said environmental performance evaluation in accordance with said ratings by companies winning the awards and e-commerce automotive businesses to communicate to consumers and other stakeholders, via the Internet and other media identification of the products which are the most environmentally sensitive, (k) whereby consumers, having an unfulfilled need to sustain the environment, are enabled to select and buy an award winning product that is among the top environmentally sensitive products of the available products and companies offering such products achieve increased sales and profits and are encouraged thereby to develop and sell new products that are more environmentally sensitive, l) and whereby the environment is improved because more environmentally sensitive products are purchased and developed instead of less environmentally sensitive products, thereby establishing a market-driven, as opposed to government regulated, approach to improving the environment.

A complete understanding of this invention may be obtained from the detailed description that follows taken with the accompanying drawings.

DESCRIPTION OF THE DRAWINGS

FIGS. 2A and 2B show an example of segmentation of the automotive market;

FIG. 3 shows example of the listing of the AMES Award winners;

BEST MODE FOR CARRYING OUT THE INVENTION

Figure 1A:
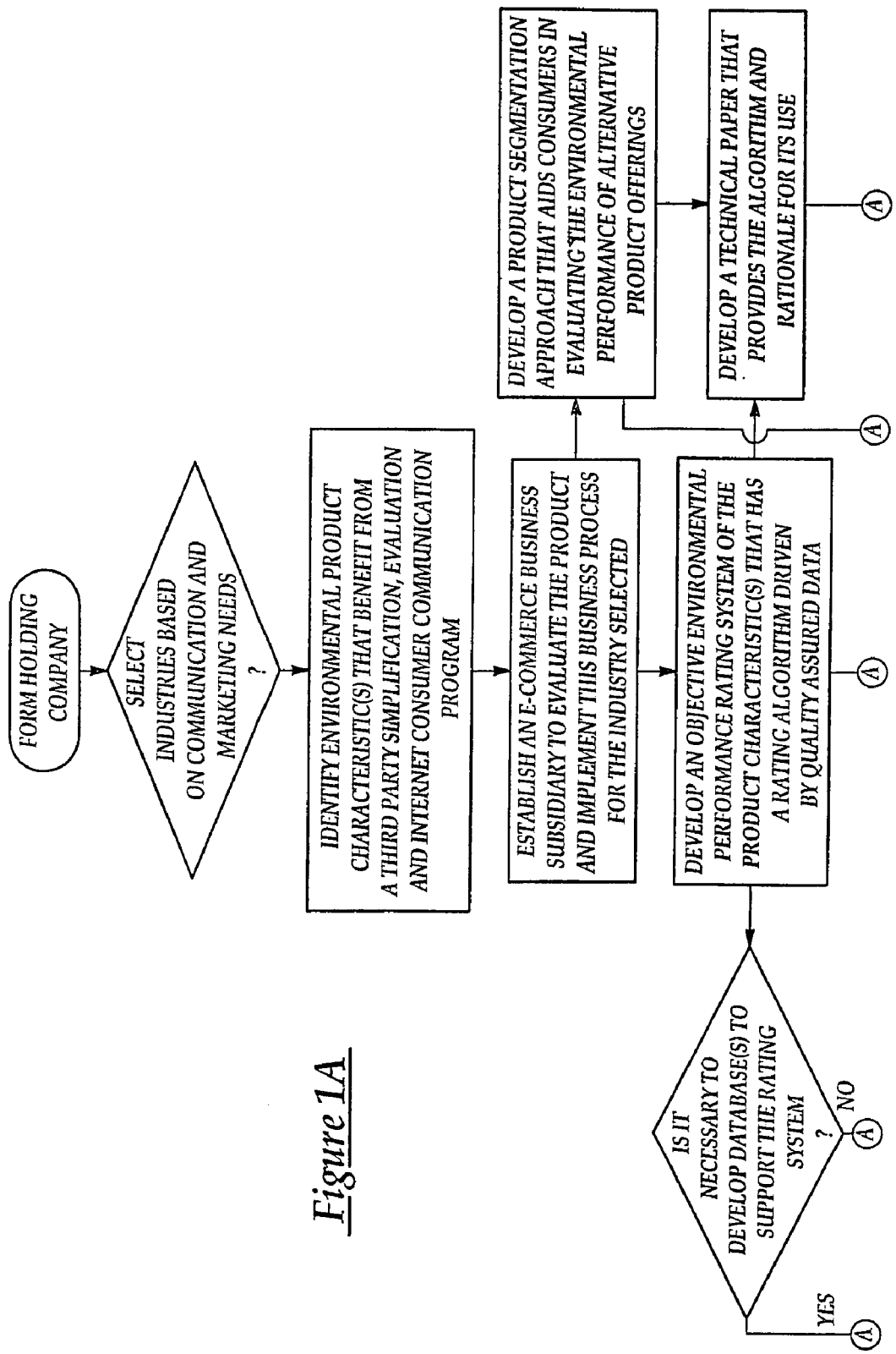
FIG. 1 is a functional block diagram of the business process of this invention.
Figure 1B:
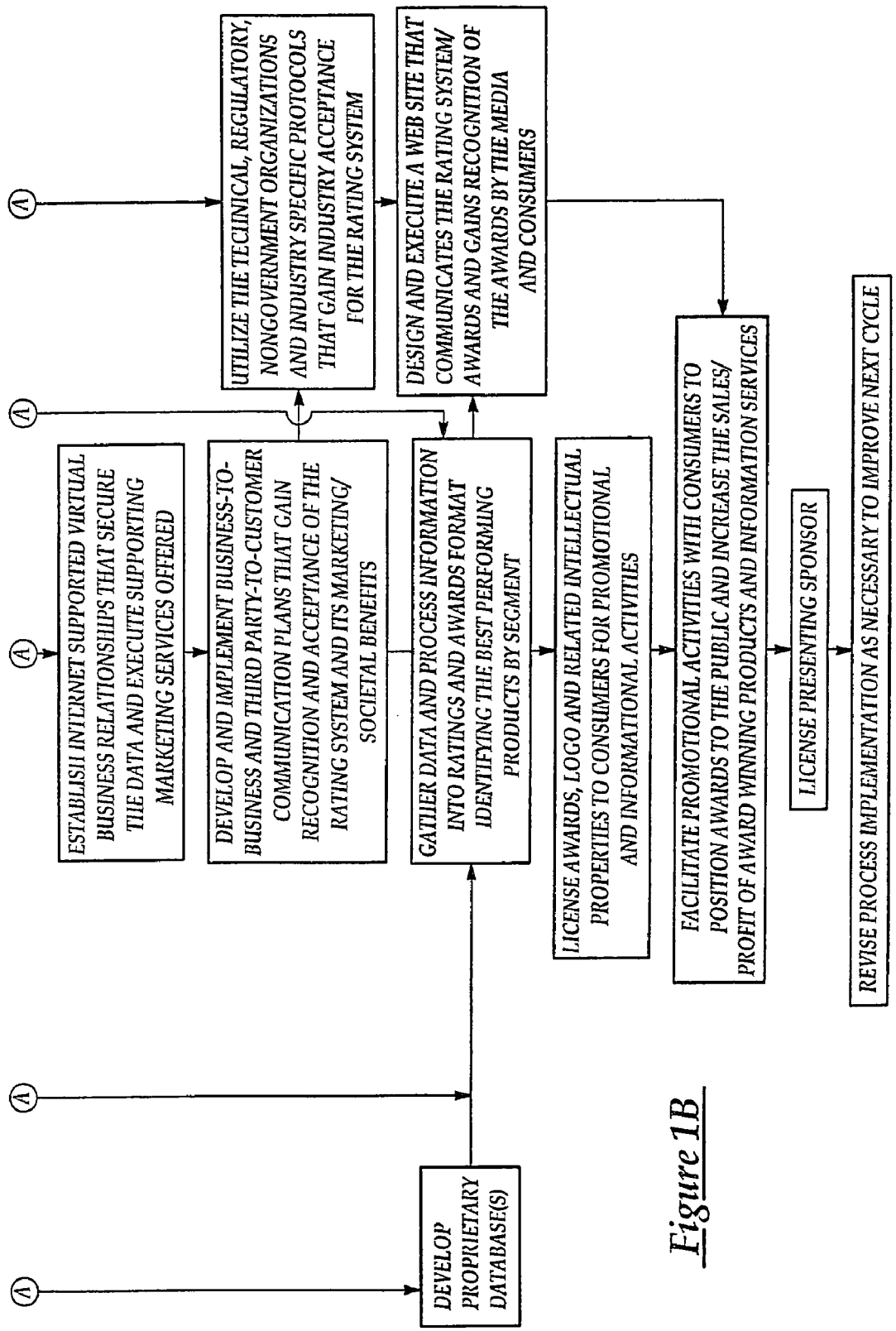

Referring now to FIG. 1, there is shown an illustrative embodiment of the invention as applied to the automotive industry. The invention is a method of processing information and data, converting it to a simple format compatible with the industry and meaningful to consumers and other users, and disseminating it, via the Internet and other media, to such users. It will be understood as the description proceeds that the invention may be implemented in different ways and is useful in a wide variety of other applications.

General Description

In accordance with this invention, an individual or a company, say the Environmental Performance Research Institute (hereafter EPRI), serves as a facilitator in selecting an industry based on the industry's need to improve both its environmental communication and environmental marketing practices. For example, say the automotive industry was selected. EPRI then determines which product or service characteristic(s) would benefit from a third party simplification and Internet consumer notification program. An e-commerce subsidiary company, say amesaward.com (hereafter AMES), is formed by EPRI to implement the program. As the "implementor", AMES objective is to improve the communication of the industry and members of the industry with the public and also with organizations, government agencies, and special interest groups related to or concerned with the industry. AMES would provide a comparative, easy-to-understand means to communicate to consumers and other stakeholders, via the Internet, the automotive brand/models that are the most environmentally sensitive. It is well-known that certain industries are held in somewhat low esteem by the public as well as by certain government agencies and special interest groups with regard to industry activities which have a deleterious effect on the environment. With respect to the automotive industry, such activities include the manufacture and sale of products which result in noxious emissions into the atmosphere, waste disposal and consumption of natural resources.

As noted above, the automotive industry will be taken as an example industry in the description of this invention although it is only one of several which might be served by this invention.

The automotive industry has had widespread attention, in regard to the environment, by special interest groups and governmental agencies as well as the general public for many years. It has been subject to government regulations, both state and federal, in respect to air pollution by engine exhaust gases and evaporative emissions. At the present, the federal government through the Environmental Protection Agency (EPA) and the Department of Energy (DOE) imposes strict standards on the sale and performance of all light duty vehicles with respect to gas mileage and in respect to noxious components in engine exhaust gases and evaporative emissions. The compliance with federal regulations, for example, and the determination thereof involves highly technical and complex procedures and nomenclature. Although publications are available to the public which give detailed information on the requirements of and compliance with the federal regulations, they are difficult, if not impossible to understand by the layman.

It is also recognized that the automotive industry has an impact on the environment by reason of its voluminous use of materials such as metals and plastics. The content of recycled materials in new products could be considered as a measure of a manufacturer's environmental sensitivity. At present, recycling is of great concern, not only to the manufacturers, but also to regulatory agencies, special interest groups and consumers.

The environmental sensitivity of a vehicle manufacturer in regard to recycling materials, as practiced in its overall vehicle production and as practiced with respect to individual models, is not regulated by governmental agencies and credible information is, practically speaking, unavailable to the public.

As a result, the person who desires to buy a new car cannot obtain useable information for identifying the manufacturers and car models which are highly rated for environmental sensitivity.

Before data collection begins, AMES segments the industry into comparable product or service groups that consumers typically consider in their purchase decision. For example in the automotive industry, product offerings could be categorized into eight car (subcompact, compact, mid-size, full-size, premium, luxury, sporty, and sports) and seven light truck (minivan, full-size van, compact pickup, full-size pickup, compact SUV, mid-size SUV, and full-size SUV) vehicle utility classes (hereafter VUC). This invention provides consumers looking for a specific vehicle utility with an opportunity to learn which product offerings in a VUC are the most environmentally sensitive. An example of the automotive market segmentation is shown in FIG. 2.

According to this invention, the public interest is served by converting highly technical data (which is available from the automotive manufacturers, EPA and DOE on environmental sensitivity but which is not understandable to the layman) and developing it into a meaningful rating or ranking of each manufacturer and/or each brand/model of vehicle on the basis of environmental sensitivity. In this process, AMES obtains all needed technical data from EPA and DOE under the provisions of the Freedom of Information Act for air pollution and fuel consumption. Such data is certified to the government as to accuracy by the manufacturers. AMES obtains all necessary technical information in regard to materials recycling from manufacturers who chose to voluntarily submit the information. To verify its accuracy an independent audit is made of the records of each automotive company by an independent auditor engaged by AMES.

AMES analyzes the technical data regarding air pollution, fuel consumption and recycling of materials for each manufacturer and each vehicle model for the period under consideration, such as the annual model year. AMES processes the data in a manner to quantify, by numerical values, the environmental sensitivity of each manufacturer and each brand/model.

The determination of environmental sensitivity for each manufacturer may aggregate environmental performance of all its brand/models as well as other automotive Life Cycle Assessment (hereafter LCA) considerations. Suitably, the manufacturer with the highest ranking and hence is designated as "Best". Manufacturers may also be segmented into classes based on their breadth of product offerings (e.g., Full Line, Focused Line or Specialty Line).

The various brand/models from all manufacturers are segmented into VUC as described earlier and the brand/models within each VUC are also ranked. The brand/models which are in the uppermost tier of ranking are recognized by awards, such as trophies or plaques. Thus, awards are presented to manufacturers for overall environmental sensitivity and awards are also given to brand/models for environmental sensitivity. Typically, the top manufacturers and the upper quartile of brand/models in each VUC would be presented with awards while manufacturers and brand/models with lower ranking would not be publicized. An example of a listing is shown in FIG. 3.

Specific Description of the Method of this Invention

The manner in which this invention is carried out will be set forth below with reference to the automotive industry as the exemplary application of the invention.

In putting the invention into practice, a company, not a member of the industry, but a member of the e-commerce industry, is established or identified by the facilitator who undertakes to implement the method. In this case the facilitator is called the EPRI and the e-commerce company is called AMES both of which include personnel with expertise in the automotive industry.

The business process steps involved in the communication, marketing and environmental performance ranking system are provided below. The sequence is not to be taken as a required sequence of performance of the steps. Further, the description of a step in the listing below indicates that it should be considered for implementation but does not indicate that it is essential to the successful implementation of the method.

The following steps are shown in FIG. 1 and are identified therein by reference numbers which are the same as the step numbers given below.

Step 1—Formation of a Facilitator Company

As discussed above, the EPRI serves as a facilitator for selecting an industry, identify product characteristics that benefit from application of this method and establishing an e-commerce business subsidiary that implements the method.

Step 2—Industry Selection by the Facilitator

The facilitator, EPRI, identifies a need in the relevant industry, in this case, the automotive industry, for improved environmental communications and environmental marketing to the consumers of its products and organizations having an interest in the industry. The facilitator identifies which field of activity by the industry gives rise to the need for improved communications and marketing. For example, the environmental performance of passenger cars and light-duty trucks as it effects the air quality, the threat of global warming, consumption of landfill space, and contamination of surface and ground water.

Step 3—Identify Environmental Product Characteristics

The facilitator then identifies criteria such as vehicle emissions, fuel economy and recycled material content which are of special concern but not communicated or marketed in a meaningful consumer friendly (i.e., readily understandable by consumers) manner to potential customers and the public. The criteria are based on accepted industry environmental impact analysis tools, such as Life Cycle Assessment.

Step 4—Establish an e-commerce Business

The facilitator establishes or selects an independent, third party e-commerce business subsidiary to implement the remainder of this method for the industry. The subsidiary (the implementor), in this case AMES, will complete the technical assessment of environmental product characteristics and implement the remaining steps in the business process. It is necessary for the staffing of the subsidiary to have relevant industry experience in the industry selected. See Step 7A for additional comments.

Step 4A—Develop a Product Segmentation Approach Within an Industry

In general, consumers shopping for products and/or services will do so by the utility that product and/or service provides. In this example, AMES has grouped cars and light trucks into VUC that have similar utility and are generally considered as competitors in the marketplace. This grouping or segmentation of the market allows essentially apples-to-apples comparison of the environmental performance of brand/models that provide the consumer similar utility.

Step 5—Develop an Algorithm for an Environmental Performance Rating System

AMES, in this example, determines a communication format which will be readily understandable by the public and consumers. Further, AMES develops an algorithm for translating the existing available data and establishes unique databases that will allow the algorithm to yield a specific numerical score for a brand/model or manufacturer. The end result is a rating of the products or services of the industry. In this step of the process it may be necessary to establish both an algorithm for generating numerical ratings and a criteria for evaluating the ratings and transforming the ratings into rankings. See Appendix A (3 pages) for the criteria established for the automotive industry example.

Step 5A & B—Decide if it is Necessary to Develop Database(s) and Develop the Database(s)

It may be necessary to develop proprietary databases to support the rating system. In the case of the automotive industry it was necessary to develop forecasts of vehicle configuration sales for the applicable model year to a level of detail only available through manufacturers and in manufacturers' submissions to government agencies classified as, "trade secrets" by the industry. If the manufacturers chose not to share information with AMES and if such databases are required, the subsidiary will have to develop the necessary processes to generate the database(s).

Step 5C—Develop Technical Paper

As a preferred step in the process (may not be necessary in all cases), a technical paper that supports the rationale for the rating algorithm may help in gaining industry and other stakeholder acceptance of the rating system. In the automotive example, a paper entitled, *Evaluating the Environmental Performance of Passenger Vehicles*, see Appendix B (26 pages), was developed. The development of a paper serves as a means to solicit concept and peer review of the rating algorithm and its associated weighting factors. In addition, it opens a dialogue with stake-holders and facilitates their input into the rating system and implementation process.

Step 6—Establish Virtual Business Relationships

As a communication and marketing e-commerce business it is necessary to establish support activities that provide the services necessary to implement specific aspects of the business process. In the automotive example it was necessary to establish virtual services for public relations, graphic arts, Web site development and hosting, legal services, marketing materials, technical consultant, award fabrication, merchandising services and other business support activities. The process establishes these support services on a virtual basis to minimize costs and maximize efficiencies of the business entity.

Step 7—Develop and Implement Communication Plans

Both a business-to-business and a third party-to-consumer communication plans need to be developed and implemented to gain acceptance for the rating system and recognition for its marketing and societal benefits. In the automotive example the plans would be developed and implemented in concert with a public relations firm. This would be considered both a launch and ongoing sustaining activity for the business entity.

Step 7A—Utilize Industry Accepted Protocols

As a supplement to the communication plans, it is necessary to learn and utilize industry-accepted protocols for the industry selected. In the automotive example it was necessary to utilize protocols such as peer review in the technical community, Auto show press preview schedules, Federal Register promulgation of applicable regulations and rules, industry sources for identification of e-commerce automotive businesses, EPA, DOE and CARB contacts, Non-Government Organizations, academic contacts, Federal Trade Commission guidelines on environmental claims, research of market trends sources and contacts at automotive manufacturers. Members of the AMES would have extensive industry experience that allowed the implementation of this process step. Establishment of e-commerce business entity in Step 4 must highly weigh this step in the selection or creation of the subsidiary.

Step 7B—Execute a Web Site

It is necessary to design and execute a Web site that communicates the environmental performance awards to the public and in particular to automotive consumers. The site serves as the central communication tool to gain recognition and acceptance for the awards and protect the intellectual property of the results of this business process. It may disclose the manner in which the award program operates to be of service to the consumer and the public in general by providing validated information that is not controlled by the industry or its members. It also serves as a portal to affiliated business enterprises that both support the service and utilize the service in their respective offerings.

Step 7C—Link Web Site to Licensees

By providing a link from the implementor's Web site, to the Web site of the licensees, the implementor (Ames in the automotive example) provides a safe harbor for claims made by manufacturers that they have won environmental performance awards. In addition, linkages provide an objective third party endorsement of the award winners, which can be used in promotional activities. Importantly, linkages provide the contractual framework in which the usage of the awards can be controlled to maintain their effectiveness in influencing consumer preferences to purchase environmentally sensitive products.

Step 8—Gather Data and Identify Top Performers

Data is secured using electronic transfer of information to maximize efficiencies and eliminate errors and omissions. The information is processed utilizing the rating algorithm and award criteria into rankings that identify the top environmental performers and award winners. Quality control techniques are employed to assure the accuracy of the calculations.

Step 9—Facilitate Promotional Activities

The results of Step 8 are announced first to the appropriate winners to provide lead time for public announcements by them and then simultaneously posted on the Web site, submitted for copyright protection and announced in copyright format to the public in a media press release. Winners are consulted to facilitate the promotional activities that will generate awareness, consideration and purchase preference. The winners that capitalize on the unfulfilled needs of a consumer base that seeks environmentally sensitive brand/models offerings will accrue increased market share and profits.

Step 9—Revise Process Implementation

A, "lessons learned", "root cause analysis" and corrective actions are performed to improve the next cycle of implementation.

Synergism of the Communication Method

Figure 4:
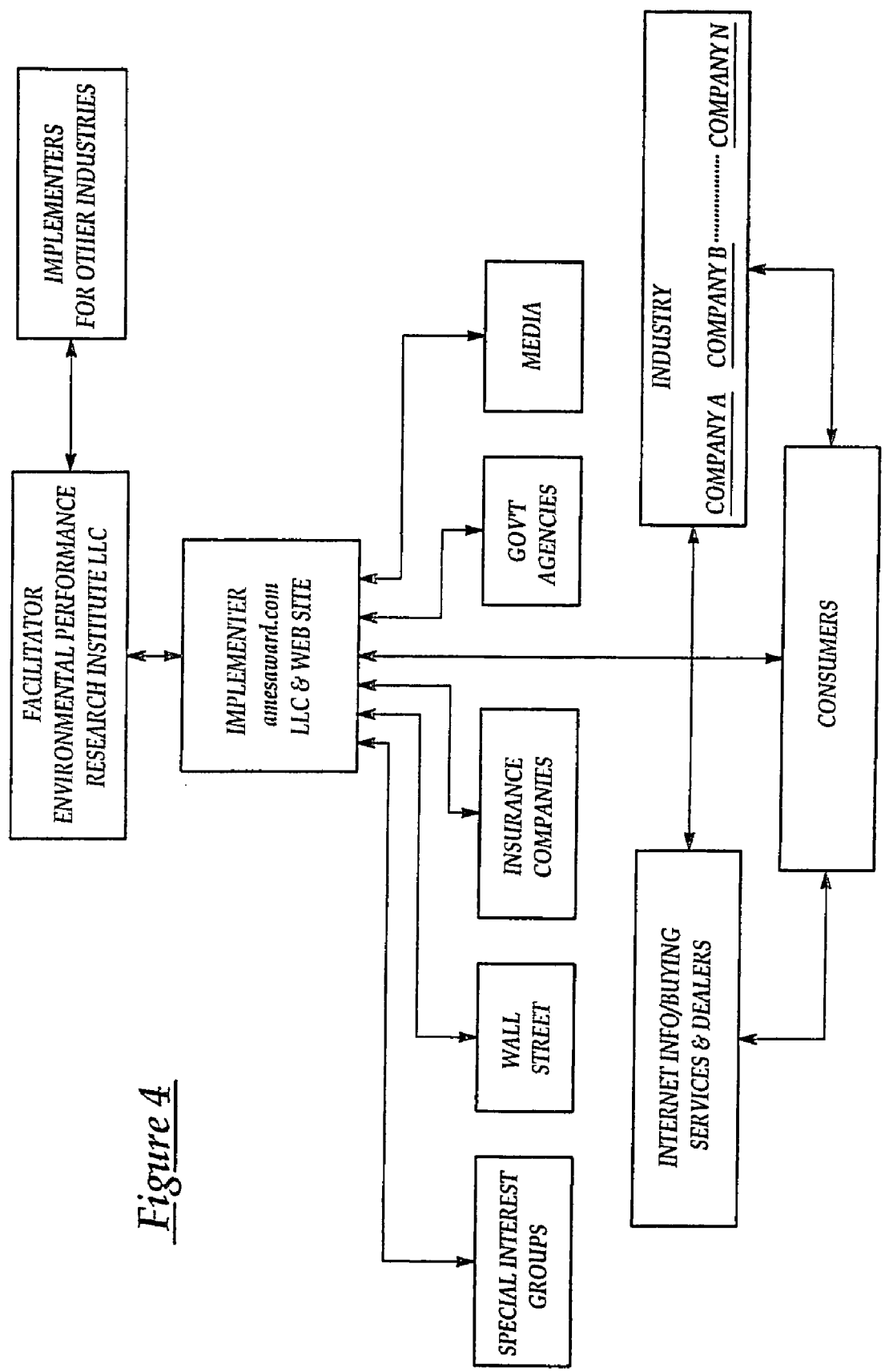
FIG. 4 shows communication flow between the facilitator, the industry and organizations relevant to the industry.

It will now be appreciated that AMES, has established a multi-party interactive network for communication with regard to the environmental sensitivity of the passenger cars and light trucks and the manufacturers as a whole. This network of communications is shown in FIG. 4.

AMES as implementor of the communication system selects and processes data and information from various sources including the industry members and governmental agencies in regard to environment performance matters. AMES analyzes the data and information and, in accordance with a predetermined algorithm, develops ratings of vehicles and manufacturers in respect to environmental sensitivity. AMES presents physical awards in accordance with the ratings and promulgates information via the Internet in respect to the higher tier of the ratings and awards.

In the communication network, AMES posts the results of its rankings on its Web site on the Internet. AMES has direct communication with government agencies such as the EPA and the DOE as well as certain state agencies. It also has direct communication with special interest groups, such as the Environmental Defense Fund, Union of Concerned Scientists, etc. and with Internet information services, such as The Kelly Blue Book, autobytel.com, edmunds.com, etc. all of whom have Web sites on the Internet. Also, AMES has direct communications with the media in respect to press releases regarding the AMES Award winning products. There is also direct communication with Wall Street, especially with the auto industry analysts, because of the impact of the degree of social consciousness of companies listed on the stock exchange. There is also direct contact with the insurance industry because rapid changes in the normal weather or environmental quality have an influence on their business. AMES also maintains a constant dialog with the vehicle manufacturers and e-commerce information and buying services to receive feedback on AMES segmentation of the market, licensing of the awards and other matters. The communication among and interaction among AMES, vehicle manufacturers, the public and other organizations is realized in many respects through Web sites on the Internet.

Figure 5:
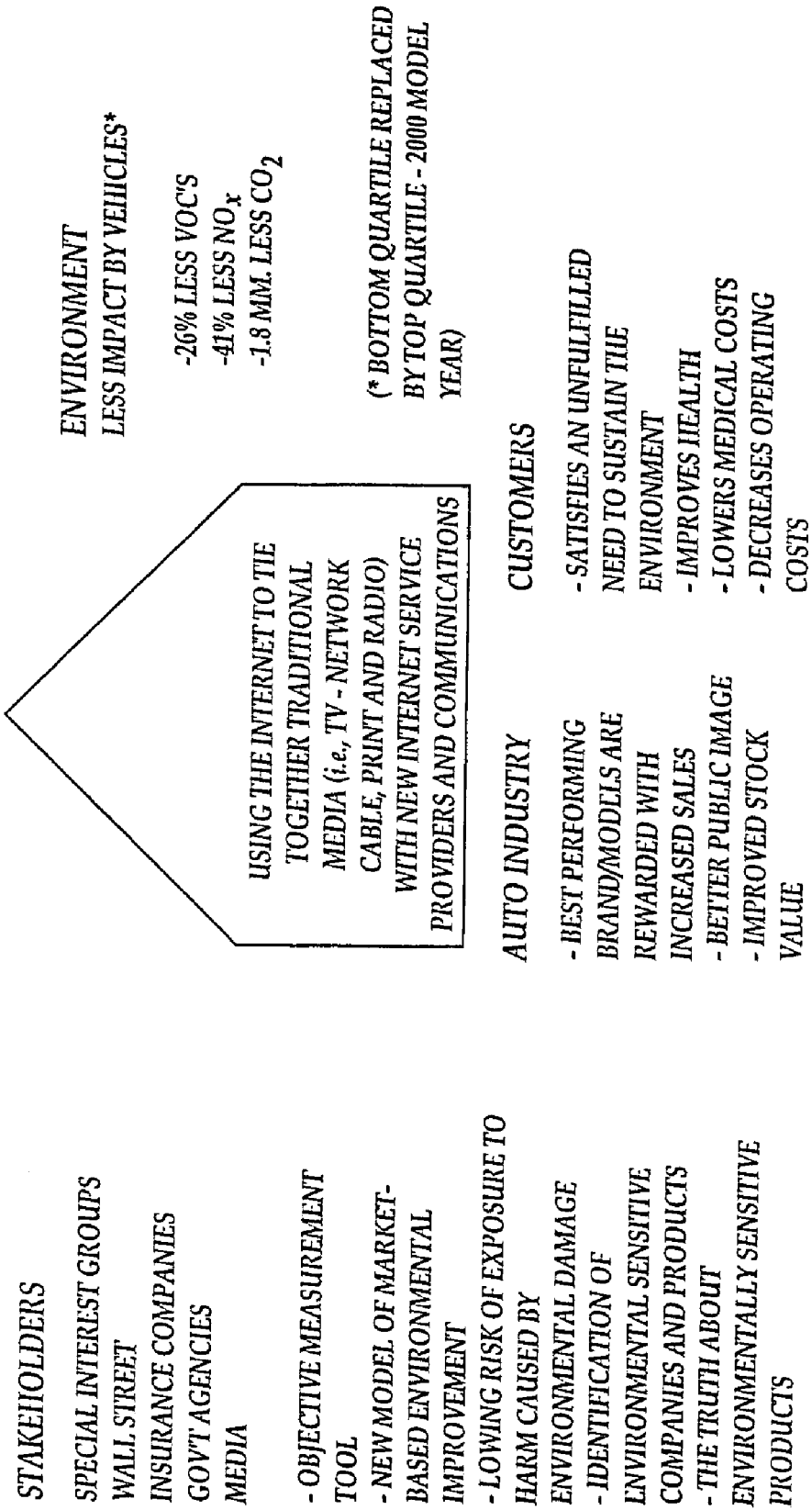
FIG. 5 is a diagram illustrating the synergism of the inventive system.

As shown in FIG. 5, each of the participants realizes benefits which arise from the activities of the others in the network and each contributes something by way of information processing and communication to others in the network and to the public. Prospective purchasers of cars or trucks gain helpful information at no cost and the sales of environmentally sensitive vehicles are enhanced by the system.

AMES, as the implementor of the system, is compensated for its services by licensing fees assessed to manufacturers for advertising and promotional use of the AMES logos and the AMES Awards. Manufacturers realize increase market share and profits by promoting and advertising their AMES Award winning brand/models.

The e-commerce information and buying Web sites on the Internet are also a source compensation for AMES by licensing the use of the AMES Award winners list, logo and Award that provides their customers with important environmental performance information and reinforcement of a third party validation to facilitate their purchase decision. The e-commerce Web sites gain incremental visitors, revenue and profits from consumers fulfilling their need to contribute to sustaining the environment.

The environment benefits from the system in that vehicles that have a lesser impact on the environment comprise a large percentage of new vehicles sold.

The government agencies and special interest groups and information services realize benefits from the system along with the media, Wall Street, and insurance companies. Thus, it can be said that the communication system of this invention is synergistic in the sense that the beneficial results achieved by the interaction of the group of participants in the system is greater than the sum of the results of the individual participants.

CONCLUSION

Although the description of this Internet based invention has been given with reference to a particular embodiment, it is not to be construed in a limiting sense. Many variations and modifications of the invention will now occur to those skilled in the art of developing a market based initiative, see FIG. 6, to contribute to sustaining the environment. For a definition of the invention reference is made to the appended claims.

Bodily Incorporated Appendix A

General Note: These criterion are based on a life-cycle-analysis methodology that sales weights vehicle configuration or model type emission certification levels, fuel economy ratings and use of recycled material content into a brand/model Automotive Market Environmental Sensitivity (AMES) index score used to rank the brand/models in fifteen vehicle utility classes (VUC, see Appendix A and Appendix B). Awards are provided for: "Best" performance—AMES BEST (VUC) AWARD™ and top quartile performance—AMES PREFERRED (VUC) AWARD™. This allows the consumer to prioritize their shopping by brand and model name, the most recognizable nomenclature in the marketplace today.

Pollution Prevention

A Pollution Prevention Index (PPI), which is the sales-weighted average of the certification levels within each brand/model offering, is determined as follows:

Vehicle configuration (i.e., "model type" using the regulatory nomenclature) sales[1] percent within the brand/model multiplied by the applicable certification value (see below) and rounded[2] to the nearest tenth. The certification levels corresponding to the certification values are as described in the US EPA Office of Mobile Sources publication EPA 420-B-98–001 and State of California Air Resources Board Proposed California Motor Vehicle Emission Control and Smog Index Label Specifications dated Jun. 1, 1999:

| Certification Value | | Certification Level |
|---|---|---|
| Gas | Diesel | |
| 10.9 | 0.0 | FTP Tier 1/LDT4 |
| 18.2 | 7.2 | FTP Tier 1/LDT2/LTD3 |
| 26.4 | 15.4 | FTP Tier 1 |
| 28.5 | 23.8 | FTP TLEV |
| 31.6 | 31.6 | FTP LEV |
| 39.0 | 39.0 | FTP ULEV |
| 40.7 | 40.7 | FTP LEV II |
| 43.3 | 43.3 | FTP SULEV |

Non-specific Propulsion
FTP ZEL 50.0
Range of ratings=0.0–50.0

Notes: [1]Sales volumes as submitted to EPA with the Manufacturer's Application for Certification (see 40 CFR Part 86) or projections developed by amesaward.com.
[2]Using the procedure and/or definitions described in Microsoft Office 98 Excel default rounding procedures.

Energy Efficiency

An Energy Efficiency Index (EEI), which is the sales-weighted average combined city and highway fuel economy for the brand/model scaled to this criteria, is determined as follows:

Vehicle configuration adjusted (see DOE/EPA MY1999 Fuel Economy Guide, page 1 note) fuel economy (see Appendix C for electric vehicle MPG equivalents) harmonic sales weighted into an average city/highway (55% city/45% highway) brand/model fuel economy adjusted to fit the fuel economy range in the DOE/EPA MY2001 Fuel Economy Guide multiplied by 40 to scale to the PPI rating and rounded[2] to the nearest tenth (EEI=40 $\{1/M_1 - 1/M_x\}/\{1 - M_1 - 1/M_2\}$ where $M_1$=lowest mileage in 2001 FE Guide {combined TBD mpg}; $M_2$=highest mileage in 2001 FE Guide {combined TBD mpg}; and $M_x$=sales weighted combined mileage of the brand/model).

Range of ratings=0.0 to 40.0

Recycled Material Content

A Recycled Content Index (RCI), which is the sales-weighted percent of curb weight that is comprised of recycled material for a brand/model scaled to this criteria, is determined as follows: Vehicle configuration by fraction of curb weight of the use of recycled materials (post consumer or post industrial recycled materials) sales[1] weighted into an average brand/model multiplied by 10.0 to scale to PPI rating and rounded[2] to the nearest tenth (100% recycled material content=10.0). Lack of an industry accepted protocol for reporting this information precludes the use of the RCI for the 2001 model year.

Range of ratings=0.0 to 10.0

Brand/Model Award

Each brand/model within a vehicle utility class has established an Automotive Market Environmental Sensitivity Index (AMESI) which is the summation of adding the Pollution Prevention Index, the Energy Efficiency Index and the Recycled Content Index (in future model years) together and comparing their AMESI to the other entries in the class.

Approximate Range of AMESI ratings=0.0 to 100.0

Notes: [1]Sales volumes as submitted to EPA with the Manufacturer's Application for Certification (see 40 CFR Part 86) or projections developed by amesaward.com.
[2]Using the procedure and/or definitions described in Microsoft Office 98 Excel default rounding procedures.

Vehicle Utility Class Definition

For cars, the vehicle utility classes are defined as: Subcompact, Compact, Mid-Size, Full-Size, Premium, Luxury, Sporty Car and Sports Car (based on body style, specifications, perceived market position and price).

For trucks, the vehicle classes are defined as: Minivan, Full-Size Van, Compact Pickup, Full-Size Pickup, Compact Sport Utility Vehicle, Mid-Size Sport Utility Vehicle and Full-Size Sport Utility Vehicle (based on body style, specifications, perceived market position and price). Additionally, for pickups—generally based on gross vehicle weight rating (gvwr) under 4,500 pounds for Compact pickup and 4,500 pounds gvwr and above for Full-Size pickup. Generally for sport utilities—cargo volume less that or equal to 65 cubic feet for Compact SUVs, cargo volume greater than 65 cubic feet but less than or equal to 90 cubic feet for Mid-Size SUVs and greater than 90 cubic feet for Full-Size SUVs.

Separate Brand/Model Definition

To acknowledge manufacturers that exceed emissions standards required by regulation and/or provide high fuel efficiency technology and/or reach leading levels of recycled material content, a vehicle can be considered a separate brand/model offering in a segment if it meets the following provisions:

1. A unique brand/model name or supplemental name (e.g., Ford—Ranger Electric, Chrysler—Epic, Chevrolet—S10 Electric) is physically on the vehicle and used for promotional purposes.
2. Offerings are generally available to the public.

Electric Vehicle MPG Equivalency

See Department of Energy's (DOE) Final Rule making published in the Federal Register: Jul. 12, 2000 (Volume 65, Number 113) 10 CFR Part 474, i.e., for Watt-hours of energy per gallon of gasoline conversion factor including petroleum-powered accessories installed=33.705 KWh/gal (no petroleum-powered accessories) 30.334 KWh/gal (petroleum-powered accessories)

BODILY INCORPORATED APPENDIX B

Abstract

Intention, Goal, and Scope. This paper proposes a metric that reflects the environmental and resource impacts of passenger vehicles. Primarily intended to assist consumers in purchasing decisions, the metric is designed to provide timely, relevant and meaningful information that captures most of the impacts occurring in the vehicle life cycle.

Background. Vehicles are significant emitters of air pollutants and a major influence on the environment. A need exists for comprehensive, objective and comparative information to describe these impacts. Reporting of environmental performance on a brand/model basis can increase consumer awareness and enhance vehicle manufacturer's marketing practices.

Methods. Using principles of life cycle assessment (LCA), objective criteria for vehicles are proposed that use available or reasonably obtainable and quality-assured data. Previous LCA studies are reviewed to help formulate the suggested metric, which is comprised of components that represent energy efficiency and greenhouse gas emissions of carbon dioxide ($CO_2$) and other gases (40% weight of the total score), emissions of ozone-forming pollutants nitrogen oxides and non-methane hydrocarbons (25%), emissions of toxicants carbon monoxide (12.5%) and particulate matter (12.5%), and solid waste generation and resource consumption (10%). Scores for advanced technology vehicles are derived in a manner consistent with conventional gasoline and diesel-powered vehicles. The weighting of the components is based on LCA results and the severity of impacts. The energy efficiency and pollutant scores, which are proportional to the reduction in emissions from a baseline vehicle, are based on emission certifications, highway and city fuel economy estimates. The waste generation and resource consumption score is based on the percent recycled content in the vehicle. At present, the recycled content of vehicles is not available on a brand/model basis, however, this information is not difficult to determine.

Results. The metric emphasizes environmental burdens in the use stage, which LCA studies indicate account for majority of emissions in the vehicle life cycle. The 200 brand/models and 1,450 engine/drive train configurations in the available 2000 model year demonstrate a large range of emissions, e.g., greenhouse gas emissions range from 176 to 1187 g/mile in $CO_2$ equivalents. The analysis demonstrates trade-offs between vehicle efficiency and emission standards that can be used by a consumer or manufacturer to achieve a desired environmental performance target.

Conclusions. While subject to limitations arising largely from information gaps, the suggested metric provides a consistent and comprehensive indicator of environmental performance useful in comparing the environmental performance of vehicles and guiding purchasing decisions.

Future Prospects. No single metric can capture the diversity of all possible impacts, concerns and trade-offs resulting from vehicles or other complex systems. Because the weighting of the component measures is judgmental and based on incomplete information, results are considered as a first step in a comparative rating system, and the need to update the metric as additional information becomes available is emphasized. Nevertheless, the suggested metric is believed to provide a useful and objective indicator of the life cycle impact of vehicles.

Keywords

Air pollutants; automobiles; emissions; environmental indicators; green labeling, greenhouse gas; indicators; life cycle assessment; motor vehicles; pollution; recycling; vehicles;

Introduction

Transportation in general and passenger vehicles (automobiles, sport utility vehicles, and light and medium duty vehicles) in particular are significant emitters of air pollutants and a major influence on the environment. Of the six criteria pollutants regulated by the US Environmental Protection Agency, transportation sources emit 60% of carbon monoxide (CO) emissions nationwide and 95% of the CO in cities, 21% of air toxics (including non-methane hydrocarbons or NMHCs) nationwide and the predominant fraction in urban areas, nearly half of the nitrogen oxides ($NO_x$) nationwide, and almost a third of particulate matter (PM).[i,ii] Both NMHCs and $NO_x$ are precursors of ozone ($O_3$), the most widespread urban air pollutant. Globally, transportation accounts for about 25% of greenhouse gas (GHG) emissions including carbon dioxide ($CO_2$), and a higher percentage in the US. Due to sharp increases in the demand for transport and comfort, $CO_2$ emissions in the transport sector worldwide may increase dramatically, e.g., by 200% in 2025.[iii] By any measure, the environmental impacts of vehicles are substantial and growing.

Information regarding the environmental impacts of vehicles that can be used to guide consumer purchases may be obtained from product rating schemes (ecolabels),[iv–viii] eco-efficiency indicators,[ix] corporate reports,[x,xi] and elsewhere. However, evaluating environmental and natural resource impacts in a comprehensive, objective and comparative manner remains challenging for several reasons. First, environmental and resource impacts are very diverse. Pollutant emissions occur to air, water and land, and each pollutant has different consequences. Air emissions of NMOCs and $NO_x$ may be toxic themselves and together form other pollutants, e.g., $O_3$, while emissions of $CO_2$, methane ($CH_4$) and nitrous oxide ($N_2O$) contribute to global warming and climate change. Second, impacts occur throughout the product life cycle, i.e., in the production, use and disposal phases, and not all impacts can be readily and accurately evaluated. Third, the derivation of a metric to consolidate and communicate environmental performance is subjective and potentially controversial. Measures such as the total tonnage of air emissions do not reflect the environmental significance of the different air pollutants. Fourth, the source of the information may influence its objectivity, content and relevance.[x] Despite these and other arguments regarding their effectiveness and credibility, (vi) interest by industry, government and consumers in environmental performance measures remains high.

This paper proposes a metric to evaluate impacts of vehicles on human health, the environment and natural resources. Using principles of life cycle assessment (LCA), criteria are proposed that capture the major share of environmental impacts and that use available or reasonably obtainable and quality-assured data. The metric can assist consumers in their purchasing decisions, as well as indicate desirable vehicle to vehicle manufacturers. After summarizing key features of the approach, the recommended environmental criteria and metric are described. The paper concludes with limitations of the approach and recommendations for future work.

Approach

The overall goals for the metric, taken in part from those used to define eco-indicators, [ix] are to provide relevant and meaningful information related to the protection of health and the environment; to be clearly definable, measurable, transparent and verifiable; and to be understandable and meaningful to stakeholders, specifically vehicle purchasers. The metric attempts to capture most of the environmental impacts attributable to passenger vehicles, including pollutant emissions, energy consumption, solid waste generation, and resource consumption.

LCA concepts guide the formulation of the metric. There is growing experience with LCAs for vehicles using both material flow (engineering)[xii–xvii] and input-output (econometric) analyses.[xviii,xix] A number of studies have been performed for components of vehicles (batteries, manifolds, etc.), as well as the transportation fuel cycle.[xx–xxii] These studies show that the principal environmental burdens associated with vehicles include emissions to air, water and land (as solid waste), and the primary resources consumed are energy, raw materials, and water. Burdens are distributed between vehicle manufacturers, material and component suppliers, petroleum extraction, refining and distribution, and others. The LCA studies provide a comprehensive examination of environmental burdens.

It is recognized that no single metric is likely to capture all impacts and other values implied by notions of sustainability. Indeed, a recent working group suggested the use of 40 separate indicators to track a range of issues.[xxiii] More fundamentally, LCA or other tools may be unable to provide reasonable estimates of certain environmental impacts due to simplifying assumptions, e.g., the lack of spatial and temporal emission information, and the use of linear, no threshold dose-response or damage functions.[xxiv–xxvi] Aspects of LCA tools and models are complex, and single indicator approaches have not been critically reviewed. [xxvii] Both site-specific and generic information, e.g., toxicity equivalencies, may be incomplete, inappropriate, and out-of-date.[xxviii] Allocations of burdens for processes that contribute to more than one product system remain problematic. [xxix] The various valuation procedures[xxx] can provide different rankings.[xxxi] Even the most thorough life cycle inventories have gaps, e.g., the vehicle manufacturing component is limited due to the incompleteness of plant data, and environmental burdens are probably underestimated.[xxxii,xxxiii] Emissions during vehicle use may be underestimated due to deterioration and failures of emission control systems and limitations of emission testing procedures,[xxxiv] and different emission estimation methods can yield disparate results.[xxxv] Emissions also depend on "external" factors such as fuel volatility and sulfur content, ambient temperature, traffic and driving cycles, and the presence and nature of vehicle inspection and maintenance ("smog check") programs. For such reasons, most LCAs emphasize inventories, environmental burdens that are classified and characterized into a few metrics, and environmental burdens are treated with the simple notion that "less is better."

Despite their limitations, LCA analyses can provide a sufficient basis for comparison within an impact category, although alternative assessment tools and criteria may be needed in some cases.[xxv] In addition, the comprehensive life cycle inventories completed for vehicles [xii–xix] have provided largely comparable results regarding the identification and quantification of the significant emission sources, despite substantial differences in methodologies and assumptions, e.g., vehicle type, weight, drive train, and driving cycle. Finally, the reliability and technical integrity of results will be enhanced by guidelines, requirements and peer review steps being developed by ISO, EPA, SETAC and others.[xxxvi–xl] Thus, the approach presented below is expected to evolve as new and enhanced information and procedures become available.

Air Emissions

Air emissions related to vehicles include GHGs ($CO_2$, $CH_4$, $N_2O$), criteria air pollutants (PM, CO, NMHC, $NO_x$, sulfur dioxide [$SO_2$], and lead [Pb]), and hazardous air pollutants (e.g., benzene, formaldehyde). The apportionment of vehicle-related emissions to the major phases of the vehicle life cycle is shown in FIG. 1, based on the average fraction in three recent studies[xv–xvii] that analyzed emissions from small, intermediate and large cars, all with internal combustion (IC) gasoline engines. For $CO_2$, the average of two IC powered vehicles and one electric vehicle (EV) is shown. The vehicle use phase (including fuel production) accounts for most GHG emissions (79–87% of $CO_2$, and 60–68% of $CH_4$), and most of the criteria pollutants (89–94% of CO, 81–90% of $NO_x$, 84–91% of NMHCs, and 63–70% of $SO_x$) Similarly, the most comprehensive review of the transportation fuel cycle shows the dominance of the use stage for CO, NMHC, $NO_x$, $CO_2$ and $N^2O$.[xxii] An input-output analysis of a midsize sedan also shows the dominance of the use stage for energy consumption and $CO_2$, as well as for emissions of the criteria pollutants (CO, $NO_x$, $SO_x$, $PM_{10}$).[xix] Only one estimate of PM and Pb emissions is available (for a gasoline engine-powered sedan[xvi]) and the use phase accounts for 31% of PM (the percentage will be higher for diesel vehicles) and 1% of Pb emissions. Since the phase-out of Pb in gasoline, essentially the entire US has achieved the ambient standard for Pb.

In summary, the use phase accounts for the bulk of GHG emissions and emissions of most criteria pollutants. As discussed later, this is today's picture. In the future, expected reductions in vehicle emissions may increase the relative importance of emissions in other phases, e.g., manufacturing.

The relative ranking or weighting of emissions can be based on many factors, e.g., potency or toxicity of the chemicals, individual or population risks, population affected, marginal control cost, social cost, etc. GHG emissions might be prioritized given the magnitude and consequence of potential impacts, but uncertainties are very high. For conventional pollutants, photochemical and urban toxic pollution caused by $NO_x$ and NMHC is widespread, and from 48 to 102 million people in the US are estimated to live in $O_3$ nonattainment areas (where the ambient standard is exceeded).[i] CO remains a serious problem, and ~9 million people live in CO nonattainment areas.[i] PM is potentially of great significance, however, nonattainment status and health impacts under the proposed PM ambient standard, which is based on particles below 2.5 μm dia ($PM_{2.5}$), are uncertain due to a lack of monitoring and other reasons.

Because they represent known problems affecting sizable populations and are currently regulated, the four conventional pollutants form half of the weight of the suggested measure, and each is weighted equally, i.e., 12.5%. GHG emissions, which potentially affect everyone, are given 40% of the score. This weighting is population-based, and roughly reflects the numbers affected by GHG emissions (40%), photochemical pollution (25% for $NO_x$ and NMHC together), and toxicants (12.5% each for CO and PM). The remaining 10% is given to solid waste generation and resource consumption of the vehicle. This weighting is simple and likely to result in rankings that are comparable to that derived using other approaches. This weighting—as any other necessarily used in a scalar performance measure—is judgmental and based on the available but incomplete information. For these and other reasons discussed below, the weights are considered a first step, and the metric may evolve to become more comprehensive, reliable and impact-based (rather than burden-based).

The pollution prevention and energy conservation components in the metric are based on environmental burdens associated with air pollution emissions in the vehicle's use phase, including fuel production. The US DOE/EPA vehicle fuel economy is utilized for the energy conservation/GHG score, and US EPA[xlii] and State of California[xlii] vehicle emission certification standards for CO, $NO_x$, NMHCs and PM are used for the pollution prevention score. Certification standards provide a high degree of standardization and quality assurance, a critical need. Depending on the certification, allowable emissions are specified for vehicle ages from 50,000 to 150,000 miles. The 50,000-mile standard is used because it is common to all certifications, and it may reflect average emissions. Cars, light and medium duty vehicles up to 8,500 lbs in weight (corresponding to vehicle types light duty trucks [LDT4] and medium duty vehicles [MDV3]) that are typically used as passenger vehicles are considered.

Energy Efficiency and GHG Emissions

As shown in FIG. 1, GHG emissions are dominated by the use phase. Over its lifetime, a typical vehicle will emit ~64,000 kg of $CO_2$ and ~50 kg of $CH_4$. The DOE/EPA Fuel Economy Guide's estimate of miles per gallon (mpg) serves as a proxy for GHG emissions. Vehicle fuel efficiency estimates (in mpg) are inversely proportional to GHG emissions from fuel production and vehicle use. Wang's transportation fuel-cycle model GREET 1.5[xxii] provides estimates of GHG emissions in $CO_2$ equivalents (including $CO_2$, $CH_4$ and $N_2O$) from feedstock, refining, distributing and vehicle operations.

To rank vehicles, the lowest mileage among passenger vehicles scores 0 points; the highest scores 40 points (FIG. 2). To reflect typical driving patterns, the average fuel economy for a vehicle is determined using DOE/EPA urban and rural mileage estimates, weights of 55 and 45%, respectively, to reflect driving patterns, and a harmonic average. The score is proportional to the reduction in GHG emissions and scaled to the range of the current model year (2000) average fuel economies, which range from 9.7 to 64.7 mpg (equivalent to to GHG emissions from 1187 to 176 g/mile). FIG. 2 shows diminishing returns, e.g., scores increase rapidly as low mileage vehicles are made more efficient, but point differences are small among efficient vehicles.

While this component of the environmental performance measure is designed to reflect energy efficiency and GHG emissions, high scoring vehicles are likely to be light in weight. Thus, high scoring vehicles are likely to utilize fewer resources and incur lower environmental impacts in their production and end-of-use phases. Ozone forming pollutants—$NO_x$ and NMHC $NO_x$ and NMHC emissions form the basis of the second component of the environmental performance measure. These pollutants form $O_3$, a widespread and significant pollutant, and NMHC emissions also contribute to urban toxic pollution. Emissions of $NO_x$ and NMHC occur primarily during the vehicle use phase (FIG. 1).

All new vehicles must meet, at a minimum, Tier 1 emission levels. For cars, $NO_x$ emission rates for Tier 1 and transitional low-emission vehicles (TLEV) are equivalent (0.4 g/mile). Current certification standards include several intermediate certifications: low-emitting vehicles and ultra-low-emitting vehicles (LEV=ULEV=0.2 g/mile), level II LEV (LEV II=0.05 g/mile), and super-ultra-LEV (SU-LEV=0.02 g/mile). Federal and California standards allow higher emissions for light duty trucks >3750 lbs (LDT2 and LDT3 Tier 1=CA MDV2=0.7 g/mile, and for trucks >5750 lbs (LDT4=CA MDV3=1.1 g/mile). California also specifies LEV, ULEV and SULEV emission standards for 5 weight classes of medium duty vehicles. For the $NO_x$ component measure, the highest emitting vehicle obtains a score of 0; a zero-emission-vehicle (ZEV) without $NO_x$ emissions in the fuel cycle receives 12.5 points. The score is proportional to the emission reduction from the $NO_x$ floor (FIG. 3). Like the GHG emission score, the floor represents the highest emission rate among current passenger vehicles, namely, the federal and California emission standards for vehicles <8,500 lbs (LDT4/MDV3 classes).

NMHC emissions occur as refueling losses (now controlled by onboard refueling vapor recovery systems), starting emissions, evaporative and running losses (controlled by regulations on hot soaks, diurnal emissions, running losses), and tailpipe emissions. All vehicles must meet certification standards for these emissions. Current standards use the same running losses (0.05 g/mile) and refueling losses (0.2 g/gal) for all vehicles considered here.

Evaporative emissions of NMHC depend on vehicle design, climate, driving patterns, fuel vapor pressure, and other factors. A simplified approach is used to estimate NMHC emissions. For cars, the national average daily number of "hot soaks," defined as a period exceeding 1 hr when the vehicle's engine is not operating, ranges from 3.86 (weekend) to 5.38 (weekday), and averages 5.0. Trucks average 5.4 hot soaks per day.[xliii] Real world tests of recent (>1986) vehicles show that properly operating vehicles have hot soak emissions somewhat below 1 g/event for fuel-injected engines, and slightly above 1 g/event for carburetor-equipped engines.[xliv] Overall, emissions of 1 g/event appear representative, equivalent to one-half of the current hot soak/diurnal emission standard of 2 g. To arrive at the total evaporative emissions, 5 hot soaks per day, each equivalent to one-half the certified standard, plus 1 diurnal cycle are assumed. Together, the 5 hot soaks plus one diurnal cycle is equivalent to 3 hot soaks/diurnal losses per day, which is assumed in the following analysis. The resulting ratio of tailpipe and evaporative emissions is similar to that given by EPA's Mobile 5 model, which is based on historical data and average driving patterns. For example, Mobile 5 predicts that evaporative emissions constitute 61% of total in-use emissions for a Tier 1 gasoline car and 54% for a light duty truck.[xxii] The simplified approach gives 53% for a car and 47% for a LDT.

For a Tier 1 car, NMHC emissions total 0.53 g/mile. Tailpipe emissions are the largest contributor (47% of the total), followed by hot soak/diurnal losses (41%), running losses (10%), and refueling losses (2%).[xlv] The California evaporative standard (for ULEV, LEV II, and SULEV vehicles) reduces emissions in 2004 from 2 to 0.65 g/mile.[xlvi] For ULEV and ULEV II vehicles, total NMHC emissions are 0.17 g/mile, and hot soak/diurnal emissions are the major contributor (42% of the total), followed by running losses (30%), tailpipe emissions (24%), and refueling (5%). For a Tier 1 heavy light duty truck (LDT4, MDV3) with a >30 gal fuel tank, the evaporative standard is 2.5 g. This vehicle sets the floor for NMHC emissions (0.73 g/mile) due to tailpipe emissions (0.39 g/mile or 53% of the total), hot soak/diurnal losses (38%), running losses (7%) and refueling losses (2% assuming 12 mpg).

The NMHC component score is based on the vehicle's total operating NMHC emissions and the following assumptions: fuel consumption as determined by vehicle fuel economy; the equivalent of 3 hot-soak/diurnal emission cycles per day; and hot soak, running, refueling and exhaust emissions as specified by the certification standard. The NMHC score is affected by fuel economy due to refueling losses, but the maximum effect is small (<0.4 point). FIG. 4 demonstrates the relationship between vehicle certification class and the NMHC score. The highest emitting vehicle (e.g., a 10 mpg Tier 1 LDT4) scores 0 points; a zero-emission-vehicle (ZEV) receives 12.5 points.

Particulate Matter

PM emissions related to vehicles include combustion products forming $PM_{2.5}$ (particles <2.5 μm dia), larger PM from tire and brake wear, and PM from entrainment of dust on paved and unpaved roads. The form of ambient standards for PM has evolved to become more relevant to human health. The older standard controlling "total suspended particulates" (TSP) was replaced in 1986 by $PM_{10}$ (particles <10 μm dia) which in turn was replaced in 1997 by $PM_{2.5}$. Current regulatory and health concerns emphasize tailpipe emissions. Unfortunately, $PM_{2.5}$ emission data are incomplete and no LCA inventory is available. TSP emissions for the vehicle life cycle have been quantified,[xxii] but there is no direct correlation to $PM_{2.5}$.

PM emissions from diesel-powered vehicles are controlled on a mass basis by US EPA and California regulations at 0.08 g/mile for light duty Tier 1 vehicles, 0.04 g/mile for TLEV, 0.01 g/mile for LEV, ULEV, LEV II, and SULEV, and 0 g/mile for ZEV. EPA does not specify standards for heavy light duty trucks (LDT3, LDT4), although California does as Tier 0 for MDV2 and MDV3 (0.08 g/mile). PM emissions from gasoline-powered vehicles are uncontrolled, although they are not necessarily innocuous. PM emissions from a properly operating gasoline-powered vehicle are likely to be on the order of 0.01 g/mile. Actual levels will be a function of fuel composition (sulfur, lead, etc.), engine load, and other factors. Like scores for the other regulated pollutants, the PM component score is based on certification levels and ranges from 0 to 12.5 points, as shown in FIG. 5. In the absence of vehicle-specific information, gasoline-powered vehicles are assumed to emit 0.01 g/mile, providing a score (10.9 points) that is equivalent to a ULEV but slightly lower than a ZEV (12.5 points).

Carbon Monoxide

Figure 6:
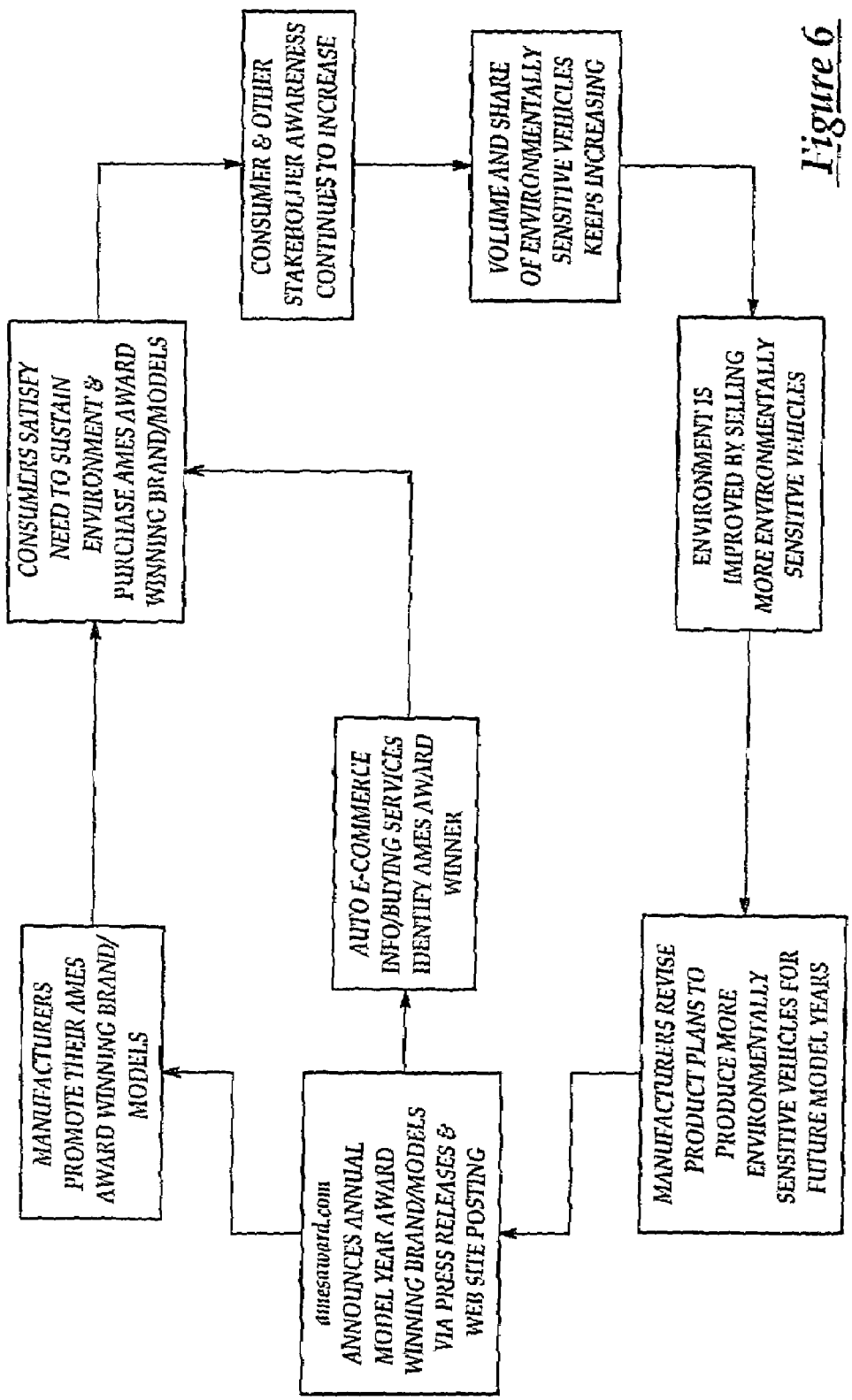
FIG. 6 is a diagram illustrating how a market-based system works.

Carbon monoxide (CO) is a local-scale pollutant emitted from the tailpipe. In-use emissions account for almost all CO emissions (FIG. 1). Scoring of CO follows the system described earlier, i.e., a Tier 1 medium duty truck, the highest emitter (5 g/mile), receives 0 points, while a ZEV receives 12.5 points (FIG. 6). Intermediate certifications exist for LDT (4.4 g/mile), Tier 1 cars, TLEV and LEV (3.4 g/mile), ULEV and LEV II (1.7 g/mile), and SULEV (1 g/mile).

Overall air pollution score

The suggested measure gives air pollutants a total of 90 points (40 for GHG emissions, 25 for $O_3$-forming pollutants $NO_x$ and NMHC, and 12.5 each for PM and CO). For each pollutant, the score is proportional to the emission reduction from the baseline level, i.e., halving the emission doubles the score. The scoring of GHG emissions is not exactly proportional since the range does not extend to zero emissions, a minor adjustment made to maintain the desired weighting.

Scores for existing certification standards, summarized in FIG. 7, show relatively rapid increases as certification levels increase up to LEV or ULEV. Increases diminish at higher certifications (LEV II, SULEV), reflecting smaller emission reductions since most emissions have been eliminated. Gasoline and diesel scores are the same for LEV and above certifications. For gasoline-powered vehicles, the largest (7–8) point increases occur from LDTV4 to LDT2/LDT3, and from LDT2/3 to LDV Tier 1, i.e., from truck to car classifications, and from LEV to ULEV. Similar increases occur for diesel-powered vehicles for the first 6 steps, up to ULEV.

The total emission score, including criteria and GHG pollutants, is depicted in FIG. 8. As shown earlier (FIG. 2), fuel economy below 20 to 25 mpg is heavily penalized. Above 30 to 40 mpg, emissions must be decreased to significantly improve the score. The tradeoffs between vehicle efficiency and emission standards can be used by a consumer or manufacturer to achieve a certain environmental performance target. For example, a 20 mpg Tier 1 gasoline car can gain a maximum of 24 points by reducing emissions (to ZEV), or a maximum of 15.8 points by improving fuel efficiency (to 65 mpg). A combination of efficiency and emission control will yield the largest improvement that is practical for a given application.

Certification of vehicle emissions to levels other than those currently specified can be easily accommodated. Scoring would follow the linear relationship between baseline levels and zero emissions. The need for representative and quality-assured measurements is critical, thus the proposed measure uses "official" certification standards. Other emission levels could be used given appropriate and equivalent quality-assurance. Also, as standards become more stringent (phase-out of Tier 1 standards by 2004 is anticipated), the floor will shift and recalibration will be necessary.

Electric and Advanced Technology Vehicles

While most emissions during the operating stage may be eliminated, alternative technology vehicles battery-powered, fuel cells, LPG, ethanol, methanol, etc.) involve "upstream" emissions in the fuel cycle that must be considered. The air pollution scores for these vehicles are derived in a manner consistent with conventional vehicles. For example, the DOE/EPA fuel economy of (battery-powered) EVs may be converted to gasoline energy equivalents (33.44 kWh=1 gal gasoline)[xlvii] and emissions based on national average emission factors for $CO_2$, $CH_4$ and $N_2O$.[xxii] GHG emissions are estimated using the vehicle fuel economy and near-term emission factors. Emission scores for alternative fuel vehicles require adjustments to be consistent with scores for conventional vehicles, which are based on certifications that consider only a fraction of current use-phase emissions. For conventional vehicles, omitted upstream emissions (from extraction, refining, and distribution) represent 41.9% of $NO_x$, 31.7% of NMHC, 2.5% of CO and 36.5% of PM of total emissions in the overall fuel cycle/vehicle use phases.[xxii] To allow comparisons to conventional vehicles, fuel cycle emissions for alternative fuel vehicles are lowered by the same percentages. As more alternative fuel vehicles make their debut, it may be preferable to increase the emission estimates for conventional vehicles to account for fuel cycle emissions. Both approaches are consistent and reward low emitting vehicles and fuel cycles.

Due to upstream emissions, a ZEV does not necessarily obtain the maximum possible air pollution score. Its score will depend on the vehicle efficiency and the energy infrastructure. As an example, a current EV obtains an emission score of 68.4 (component scores for GHG=31.8, NMHC=12.1, CO=12.2, $NO_x$=7.4, PM=4.9 using efficiency and emission data from Wang[Xxii]). For comparison, a conventional Tier 1 car obtaining 22.4 mpg will obtain a emission score of 53.0 (component score points for GHG=26.7, NMHC=3.5, CO=4.0, $NO_x$=8, PM=10.9. Although the EV has higher $NO_x$ emissions, GHGs, NMHC and CO emissions are considerably lower. The EV score is tied by a 44 mpg LEV, a 26 mpg ULEV, or a 21 mpg SULEV. These scores omit the solid waste and resource consumption components, described later.

The evaluation of electric and advanced technology vehicles is complicated by differences in the spatial pattern of emissions. These differences primarily affect impacts of the criteria and toxic pollutants as GHGs have a long residence time and are widely dispersed. For example, most electricity in the US is generated at several hundred power plants burning fossil fuels, most of which are equipped with tall smoke stacks and located in rural areas. Given the dilution and distance from population centers, health impacts for a given emission of CO, NMHC and $NO_x$ (direct toxicity only) from power plants may be lower than the same emission in an urban area. Consequently, in their analysis DeCicco and Thomas[iv,vii] reduced the impacts from power plant emissions by 10-fold, and from refineries and factories by 5-fold. However, power plant emissions of $NO_x$ and PM are regional pollutants, staying airborne for several days, and power plant $NO_x$ is an effective 03 precursor. Thus, no such adjustment was used here. Additional spatial factors include differences in the distribution of energy sources, e.g., more of the electricity in the Pacific northwest is generated by hydropower, and regional variation in ecological sensitivity, e.g., acidification most strongly affects poorly buffered soils and lakes like those in the Adirondack region of New York.

In addition to spatial factors, the composition of emissions in the fuel cycle of advanced technology vehicles may differ from emissions of conventional vehicles. As examples, coal-fired electric generating plants release large quantities of $SO_2$ and mercury (but relatively low emissions of NMHCs), and life cycle emissions of Pb for battery-powered ZEVs exceed those for conventional vehicles (using lead-free fuel).

Spatial and compositional differences in the vehicle use and fuel cycles also can influence environmental and health impacts attributable to both conventional and advanced technology vehicles. For example, a gasoline-powered vehicle in Texas contributes more to $O_3$ formation and impacts than the same vehicle in Nebraska. A SULEV vehicle in California using low sulfur fuel emits less PM than in areas where this fuel is unavailable. Differences in driving cycles, temperatures and other factors affect emissions. LCA inventories and impact assessments do not provide the data needed to address these issues. Additionally, the knowledge base needed for appropriate analyses has many gaps. Thus, the suggested indicator is currently limited to consideration of $NO_x$, NMHC, CO, PM and GHG emissions using national average emission factors. Conventional and advanced technology vehicles are treated consistently since the same pollutants and scaling are used. When quality-assured information becomes available, additional pollutants and regional considerations might be added to the metric.

Solid Waste and Resource Consumption

Solid wastes are produced throughout a vehicle's life cycle, including materials production, assembly, operation, service and end-of-life phases. Waste generation and disposal consumes landfill space, potentially contaminates surface and groundwater, and has other impacts. Many impacts tend to be localized and difficult to assess without site-specific analyses. Waste generation without recycling also represents resource consumption.

Materials production, e.g., mining, is responsible for the bulk (60%) of wastes throughout the vehicle life cycle.[xvi] Most of these wastes are not considered solid or industrial wastes. Materials production and manufacturing together produce about 19% of the wastes in the vehicle life cycle.[xvi]Vehicle operation and service produce liquid wastes, e.g., brake fluid, engine coolant, engine oil, transaxle fluid, and windshield cleaner fluids, as well as solid wastes, e.g., air filters, batteries, brake pads, drive belts, lamp bulbs, exhaust systems, oil filters, PCV-valves, shock absorbers, spark plugs, tires, transaxle fluid filters, windshields, windshield wiper blades, etc. On a mass basis, these represent an estimated 10% of the total solid and industrial waste.[xvi] Vehicle end-of-life management, which includes dismantling, recycling, shredding and landfilling, has received considerable attention, and 70–80% of vehicle mass (mainly ferrous and non-ferrous metals) is currently recycled.[xlviii,liv] In comparison to the remainder of the life cycle, GHG emissions ($CO_2$ and $CH_4$) and energy consumption from end-of-life management are small, well below 1% of the total.[xvi,xlix] However, vehicle end-of-life is responsible for most (71%[xvi]) of the solid and industrial wastes.

Several indicators can be formulated to capture waste generation and resource conservation impacts at the production phase, end-of-life phase, or possibly both (as long as there is no double counting). For example, at the production phase, the recycled content measured as the percentage of weight of the total vehicle reflects the manufacturer's current efforts to conserve and recycle materials. Similarly, the non-recycled weight of the vehicle might be used to indicate resource consumption. Compared to the recycled percentage, the non-recycled weight provides an absolute impact measure that is proportional to resource consumption. This potential advantage is offset, however, by scaling issues resulting from the wide range of vehicle weights. For example, assume a 10 point scale where 0 represents only recycled materials and 10 represents the use of only virgin materials for the heaviest (8,500 lb) vehicle. Without any recycling, a 1,500 lb vehicle would score 8.2 (10*[1−1500/8500]) points. To obtain the same score, 82% recycled content is required for the heavy vehicle. Thus, this measure de-emphasizes the importance of recycling efforts for smaller vehicles. As a second example, the percentage of material by weight that goes to landfill has been suggested as an environmental performance measure.[xxvii] This end-of-life measure does reflect waste reduction initiatives and increased recycling. However, the waste disposal fraction depends on economics and the technical infrastructure in the recycling industry, which is largely separate from vehicle manufacturing in the US. In addition, recycling/landfilling of vehicles occurs many years after manufacturing, during which the economics and technology may change significantly. Lastly, data regarding the vehicle weight fraction going to landfill for specific vehicle models are unavailable.

The suggested solid waste and material consumption component uses the recycled content of the vehicle, and is scored as 10 for a vehicle that uses 100% recycled content (by weight) and as 0 for a vehicle that uses no recycled materials. The small weight (10%) of the solid waste and material consumption score reflects the relatively minor contribution of the materials production, manufacturing and end-of-life phases to the vehicle's total environmental impact.

Unlike the other components of the performance measure, solid waste and material consumption data have not been published. The determination of recycled content must be done in a quality-assured manner, e.g., using a certified audit. For conventional vehicles, most weight is attributable to a small number of materials, e.g., ferrous metals (64%), plastics (9.3%), nonferrous metals (largely aluminum, copper and lead totaling 9%), rubber (6.9%), glass (2.8%), and fluids other than gasoline (2.7%).[xvi] Given that most weight is contributed by relatively few items, the determination of the recycled content of the bulk of a vehicle's weight does not pose significant practical difficulties.

Discussion and Conclusion

The suggested performance measure is designed to capture the major environmental burdens of vehicles on a brand/model basis. In the US, purchasers select among over 200 brand/models in 1,450 engine/drive train configurations. Configurations within a brand/model can be evaluated separately, or combined to develop a composite rating for that brand/model. Model-specific information is valuable to consumers contemplating purchasing decisions as well as manufacturers, "upstream" suppliers and the "downstream" waste and recycling industry, all endeavoring to improve the vehicle's life cycle performance. Such information supplements the incomplete and fragmented approaches represented by the current federal fuel economy ratings printed on new vehicle stickers, and the emission standard labeling programs of a few states.[vii] The suggested performance measure can be used to compare models within a given year. Year-to-year comparisons may not be appropriate since the measure is calibrated to a particular year. Of course, purchasing decisions depend on many factors, for example, performance, body style, safety and environmental performance. The environmental performance measure may be most relevant to decisions among comparable vehicles, e.g., compact cars that have similar non-environmental attributes.

Limitations

No single metric can capture the diversity of all possible impacts, concerns and trade-offs resulting from vehicles or other complex systems. While we believe that the suggested performance measure is justifiable, the weights combining the component scores are acknowledged to be judgmental and thus subjective. As discussed below, the quantification of the weights—as well as the formulation of any scalar or multidimensional performance measure—is restricted to the information that is currently available. However, this does not mean that such metrics should not be used. Rather, indicators are formulated to convey what is believed to be the most relevant information distilled into an easily understood scale.

The proposed metric has several limitations. It focuses on the use stage and does not consider all impacts from upstream discharges, e.g., manufacturing, fuel refining, and extraction and production of fuel and other materials that produce drilling and mining wastes, brines and other wastes. However, current LCA studies indicate that the environmental burdens of vehicles, like dishwashers, refrigerators, televisions, and similar goods,[vii] arise largely from use. Several potentially important impact categories are either excluded or not well addressed, in particular ecological impacts, e.g., water pollution such as spills of MTBE-containing gasoline, acidification, and toxicity. Unfortunately, the available data and methodologies do not support an inventory, allocation and impact evaluation method that can provide quality-assured estimates of these impacts. To an extent, this issue is offset by the fact that all car manufacturers utilize identical or similar commodities, e.g., iron, steel, plastic, glass, electricity, etc., and all must comply with the same federal environmental laws. Thus, there is little reason to expect major differences among impacts for a particular material used in different vehicles.

The emission scores do not account for the unanticipated in-use deterioration of control systems, and the energy efficiency and GHG emission scores do not account for changes in fuel economy and the fuel cycle over the vehicle lifetime. With vehicle aging and deterioration, emissions may substantially increase. The proposed performance measure could be altered to incorporate anticipated changes, however, the proposed approach was selected for several reasons. First, measurements of in-use emissions can not be obtained until 3 or 4 years following model introduction, thus this information would not be timely for purchasers of new vehicles. Second, even after the application of deterioration factors to account for model aging, the relative differences between certification standards would be maintained, and scoring would be unaltered. Third, certification standards specify that emission controls must last a substantial period, e.g., 5 years/50,000 miles, and the newest regulations specify a 100,000 to 150,000 mile lifetime. Fourth, component scores must be based on reliable information. The magnitude and apportionment of emissions due to system deterioration are uncertain. Similarly, predictions of the energy mix have not proven accurate. Overall, vehicle certification standards and fuel cycle information represent the highest quality data currently available.

In the future, manufacturing emissions may become more important as in-use emissions are reduced. For example, NMHC emissions from manufacturing are estimated to range from 5 to 20 kg/car.[xv,xxxii] In use, a Tier 1 car emits 72 kg of NMHCs; this will be reduced to 23 kg for a 2004 ULEV California vehicle. Both estimates assume emissions at certification levels. Thus, poorly controlled manufacturing emissions may approach or exceed ULEV operating emissions. At the same time, evolving "low-emission" manufacturing processes and more stringent pollution controls may decrease emissions. Certain manufacturing emissions may be reliably quantified and allocated to vehicle types, e.g., emissions from painting/coating. While currently unavailable, this information could be incorporated into the metric/. Future LCA inventories are expected to increase the scope and quality of upstream data. Inclusion of manufacturing emissions would provide a more complete assessment, although in-use and fuel cycle emissions are expected to continue to dominate life cycle emissions.

The environmental performance measure does not account for vehicle lifetime. A more durable and longer lasting vehicle may have a lower environmental impact, other things being equal, since manufacturing impacts are lower on a per mile basis. Recent trends do not support this assumption, however, since older vehicles can be large emitters. Also the metric does not account for vehicle comparability, i.e., an 8 passenger van is scored identically to a 2 passenger sports car. Impacts based on a passenger-mile or a ton-mile basis might be relevant in commercial applications, but a per mile basis appears the most relevant and compelling unit of analysis for personal vehicles.

Calibration and Weighting

There are many issues involved in the formulation and calibration of indicators representing complex and diverse environmental impacts. While the proposed metric is believed to correlate to environmental impacts, it does not directly indicate impacts, and ultimately the weighting used in the indicator must be regarded as subjective. Different weights could be used to combine component measures related to emissions of air pollutants, recycled content, and other environmental factors. There is a large literature related to integrated assessments, risk-cost-benefit, damage functions and social costs, willingness-to-pay, and other evaluation techniques. With sufficient and accurate information, these techniques might provide rational approaches for developing weightings among impact categories. However, their application to calculate health, environmental and natural resource impacts for the vehicle life cycle involves several challenging steps: (1) deriving appropriate emissions for all pollutants of concern; (2) quantifying source-receptor relationships, e.g., accounting for spatially and temporally varying environmental transport and fate processes; (3) defining and quantifying cause-effect relationships, e.g., dose-response curves for morbidity and mortality of humans and biota; and (4) providing consistent, representative and long-term valuations of impacts, e.g., determining the monetary equivalent of an acidified lake, extinction of a fish species, asthma attack, etc. To obtain meaningful weightings, quantifications throughout the four steps must be correct.

Several analyses have estimated social costs of some impacts from emissions in the transportation fuel cycle.[iv, vii, l, li] For example, the total health-related pollution impact for an average 1998 vehicle has been estimated as $0.0137/mile, with fractional contributions from $NO_x$ (43% of the impact), $SO_x$ (37%), $PM_{10}$ (14%) NMHCs (4%), and CO (3%). [vii] This analysis suggests that PM, NMHC and CO are relatively unimportant and should be de-emphasized. However, the damage function excludes many impacts, e.g., ecological impacts, and it does not fully represent variation and uncertainty. Consequently, impact estimates can vary over several orders of magnitude, e.g., the relative importance of PM has recently increased dramatically.[iv] In contrast, the suggested indicator is simple and robust, that is, insensitive to uncertain parameters. Differences between the suggested measure and those based on social costs may not be that large since emission certification standards address multiple pollutants simultaneously, e.g., moving from Tier I to LEV reduces 3 of 4 regulated pollutants. Finally, it should be noted that the suggested performance measure is formulated primarily to guide purchasing decisions among the many brand/models available, not to determine regulatory decisions or research priorities. Such decisions require more comprehensive and sophisticated analyses than can be represented in any scalar metric.

There is some overlap between several of the component scores. The energy conservation score indirectly indicates resource consumption since vehicles with poor fuel economy tend to be heavy. The energy conservation score also affects the NMHC score, although the effect is small. These interactions and the other trade-offs (FIGS. 7 and 8) should be recognized by manufacturers aiming to improve the environmental performance of their vehicles.

The suggested environmental performance measure is calibrated to the current vehicle mix and fuel cycle, in particular, the lowest and highest performing vehicles. As vehicle performance is upgraded, the baseline will shift and scores across model years may not be comparable. The measure is primarily intended to enable comparisons among vehicles in a given model year.

Future Work

This evaluation represents a "snapshot" of present-day conditions, using available data and analyses based on existing technology and market conditions. In the future, a number of factors are expected to change. As examples, widespread adoption of alternative fuels such as ethanol (corn, cellulosic) may decrease $CO_2$ emissions by 30–60%[liii] or in the long term by up to 100%[liiii] compared to gasoline (although $NO_x$ and some other emissions may increase). The recycled fraction of vehicles may change as vehicle composition is altered and plastic recycling efficiency is increased; also, landfill limitations or regulations may affect recycling and disposal practices.[liv] Databases and data quality will improve in the future as LCA applications become more widespread and refined. Generic data quality concerns, especially for the inventory phase, include coverage, precision, completeness, representativeness, consistency, reproducibility and allocation. Particular needs include better data regarding PM and NMHC emissions, and manufacturing emissions (including toxic and persistent pollutants) on a model basis. With improved data, a meaningful allocation of manufacturing emissions to specific vehicle models may become feasible. The need to update the metric as additional information becomes available is strongly emphasized. These and other changes will result in better information regarding the life cycle impact of vehicles that can be incorporated into the suggested environmental performance measure.

Acknowledgements

We acknowledge and thank the following individuals for their suggestions and comments on this paper: Charles Griffith, Roland Hwang, Greg Keoliean, Marc Ross, Martin Thomas, Michael Wang, and Carrie Ziehl. The anonymous reviewers provided a number of helpful suggestions and clarifications.

We claim:

1. A data processing method using a computer network for converting vehicle environmental performance data into meaningful and readily understandable information for use by consumers as an aid in their selection of a vehicle for purchase and by vehicle manufacturers to facilitate awareness of their vehicles through advertising, said method comprising the steps of:

obtaining said vehicle environmental performance data;

identifying vehicles by vehicle manufacturers, brands, and models;

identifying said vehicle models by vehicle configurations;

establishing vehicle utility classes for said vehicles;
grouping said vehicle models into said vehicle utility classes to allow evaluation of environmental performance of said vehicle models by said vehicle utility classes;
developing forecasts of sales of said vehicle configurations;
identifying vehicle environmental performance data components;
obtaining environmental performance values for said environmental performance data components by said vehicle configurations;
developing environmental performance scores for said vehicle models by sales-weighting said environmental performance values of said environmental data components by said forecasts of sales;
ranking said vehicles by comparing said environmental performance scores of said vehicle models in said vehicle utility classes to identify top performers of said vehicle models in said vehicle utility classes;
establishing an Internet web site; and
using said Internet web site to communicate over said computer network said top performers to aid said consumers in their vehicle purchasing decisions.

2. The method of claim 1, further comprising the step of:
further developing said environmental performance scores by component-weighting said environmental performance scores by said environmental performance data components according to at least one of life cycle analysis results and a judgment of the severity of environmental impacts of said environmental performance data components.

3. The method of claim 1, further comprising the step of:
licensing use of at least one of a list of said top performers, a logo, and an award to at least one of said manufacturers.

4. The method of claim 1, further comprising the step of:
ranking said vehicles by comparing said environmental performance scores of said vehicle models to identify top performers of said vehicle brands.

5. The method of claim 4, further comprising the step of:
ranking said vehicles by comparing said environmental performance scores of said vehicle models to identify top performers of said vehicle manufacturers.

6. The method of claim 1 wherein said ranking said vehicles step includes said top performers being a predetermined top percentile of said vehicle models by said vehicle utility classes.

7. The method of claim 6 further comprising the step of:
presenting awards to manufacturers of said predetermined top percentile of said vehicle models.

8. The method of claim 6 wherein said ranking step includes said top percentile being a top quartile of said vehicle models by said vehicle utility classes.

9. The method of claim 6 wherein said ranking step includes said top percentile being the best of said vehicle models, in environmental performance, by said vehicle utility classes.

10. The method of claim 1 wherein said grouping step includes said vehicle utility classes including car classes and light truck classes.

11. The method of claim 10 wherein said car classes include subcompact, compact, mid-size, full-size, premium, luxury, and sports car, and further wherein said light truck classes include minivan, full-size van, compact pickup, full-size pickup, compact sport utility vehicle, mid-size sport utility vehicle, and full-size sport utility vehicle.

12. The method of claim 1 wherein said step of identifying vehicle environmental performance data components includes identifying a fuel consumption component that is convertible to a miles-per-gallon equivalency component for electric vehicles using a watt-hours of energy per gallon of fuel conversion factor.

13. The method of claim 1 wherein said step of identifying vehicle environmental performance data components includes identifying a solid waste and material consumption component, and further wherein said step of obtaining environmental performance values includes obtaining recycled content values.

14. The method of claim 13, further comprising the step of:
verifying the accuracy of at least a portion of said vehicle environmental performance data using an independent auditor to audit said at least a portion of said vehicle environmental performance data.

15. The method of claim 13 wherein said step of obtaining recycled content values includes obtaining recycled content in weight values of given vehicle configurations by multiplying recycled content percentages of said given vehicle configurations by curb weights of said given vehicle configurations.

16. The method of claim 15 wherein said step of weighting said environmental performance values includes multiplying said weight values of said given vehicle configurations by percentages of sales of said vehicle models that said given vehicle configurations represent.

17. The method of claim 16 further comprising the step of:
further weighting said environmental performance scores by said environmental performance data components according to at least one of life cycle analysis results and a judgment of the severity of environmental impacts of said environmental performance data components, wherein said solid waste and material consumption component is weighted at about ten percent of said scores.

18. The method of claim 1, further comprising the step of:
verifying the accuracy of at least a portion of said vehicle environmental performance data using an independent auditor to audit said at least a portion of said vehicle environmental performance data.

19. The method of claim 1 wherein said step of obtaining environmental performance values includes obtaining certification values from government air pollution certification values.

20. The method of claim 19 wherein said step of identifying vehicle environmental performance data components includes identifying an air pollution component and said method further comprises the step of further weighting said environmental performance scores by said environmental performance data components according to life cycle analysis results and a judgment of the severity of environmental impacts of said environmental performance data components, wherein said air pollution component represents about fifty percent of said scores.

21. The method of claim 20 wherein said air pollution component is component-weighted by substantially equal parts of photochemical pollutants and toxicant pollutants.

22. The method of claim 21 wherein said photochemical pollutants are weighted by substantially equal parts of $NO_x$ and NMHC and said toxicants are weighted by substantially equal parts of CO and particulate matter.

23. The method of claim 19 wherein the percentage of sales that each vehicle configuration represents within its respective vehicle model is multiplied by a certification value for said each vehicle configuration.

24. The method of claim 1 wherein said step of obtaining environmental performance values includes obtaining miles-per-gallon values from government data.

25. The method of claim 24 wherein said step of identifying vehicle environmental performance data components includes identifying a fuel consumption component and said method further comprises the step of further weighting said environmental performance scores by said environmental performance data components according to at least one of life cycle analysis results and a judgment of the severity of environmental impacts of said environmental performance data components, wherein said fuel consumption component is weighted at about forty percent of said scores.

26. The method of claim 24 wherein said fuel consumption component is calculated by multiplying the percentage of sales that each vehicle configuration represents within its respective vehicle model by a miles-per-gallon value for said each vehicle configuration.

27. The method of claim 26 wherein said fuel consumption component is further calculated according to the following:

$$(1/M_1 - 1/M_x)/(1/M_1 - 1/M_2);$$

where
$M_1$ = lowest vehicle configuration mileage in all vehicle utility classes
$M_X$ = sales-weighted mileage of the vehicle model
$M_2$ = highest vehicle configuration mileage in all vehicle utility classes.

28. The method of claim 1 wherein said step of obtaining said vehicle environmental performance data involves obtaining said data from at least one of a government source and a manufacturer source.

29. The method of claim 1 wherein said step of developing forecasts of sales involves developing said forecasts substantially concurrently with a beginning of a vehicle model year.

30. The method of claim 1 wherein said communicating step involves using the Internet to freely communicate said results.

31. A data processing method using a computer network for converting environmental performance data into meaningful and readily understandable information for use by consumers as an aid in their selection of a product or service for purchase and by businesses to facilitate awareness and consideration of their products or services through advertising, said method comprising the steps of:
obtaining said environmental performance data;
identifying products or services by business entities, brands, and models;
identifying said models by configurations;
establishing utility classes for said products or services;
grouping said models into said utility classes to allow evaluation of environmental performance of said models by said utility classes;
developing forecasts of sales of said configurations;
identifying environmental performance data components;
obtaining environmental performance values for said environmental performance data components by said configurations;
developing environmental performance scores for said models by sales-weighting said environmental performance values of said environmental data components by said forecasts of sales;
ranking said products or services by comparing said environmental performance scores of said models in said utility classes to identify top performers of said models in said utility classes;
establishing an Internet web site; and
using said Internet web site to communicate over said computer network said top performers to aid said consumers in their purchasing decisions.

32. The method of claim 31, further comprising the step of:
further developing said environmental performance scores by component-weighting said environmental performance scores by said environmental performance data components according to at least one of life cycle analysis results and a judgment of the severity of environmental impacts of said environmental performance data components.

33. The method of claim 31, further comprising the step of:
licensing use of at least one of a list of said top performers, a logo, and an award to said business entities.

34. The method of claim 31, further comprising the step of:
ranking said products or services by comparing said environmental performance scores of said models to identify top performers of said brands.

35. The method of claim 34, further comprising the step of:
ranking said products or services by comparing said environmental performance scores of said models to identify top performers of said business entities.

36. The method of claim 31 wherein said ranking said products or services step includes said top performers being a predetermined top percentile of said models by said utility classes.

37. The method of claim 36 further comprising the step of:
presenting awards to business entities of said predetermined top percentile of said models.

38. The method of claim 36 wherein said ranking step includes said top percentile being a top quartile of said models by said utility classes.

39. The method of claim 36 wherein said ranking step includes said top percentile being the best of said models, in environmental performance, by said utility classes.

40. The method of claim 31, further comprising the step of:
verifying the accuracy of at least a portion of said environmental performance data using an independent auditor to audit said at least a portion of said environmental performance data.

41. The method of claim 31 wherein said step of obtaining said environmental performance data involves obtaining said data from at least one of a government source and a business entity source.

42. The method of claim 31 wherein said step of developing forecasts of sales involves developing said forecasts substantially concurrently with a beginning of a product or service model year.

43. The method of claim 31 wherein said communicating step involves using the Internet to freely communicate said results.

* * * * *